United States Patent
Mizutani et al.

(10) Patent No.: US 6,612,660 B2
(45) Date of Patent: Sep. 2, 2003

(54) VACUUM BOOSTER APPARATUS AND A BRAKE APPARATUS

(75) Inventors: Yasuji Mizutani, Susono (JP); Motoshi Suzuki, Nagoya (JP); Hirofumi Nitta, Kariya (JP)

(73) Assignee: Toyota Jidoshi Kabushiki Kaisha, Toyota (JP)

( * ) Notice: Subject to any disclaimer, the term of this patent is extended or adjusted under 35 U.S.C. 154(b) by 0 days.

(21) Appl. No.: 10/046,145

(22) Filed: Jan. 16, 2002

(65) Prior Publication Data

US 2002/0067072 A1 Jun. 6, 2002

Related U.S. Application Data

(62) Division of application No. 09/285,052, filed on Apr. 2, 1999.

(30) Foreign Application Priority Data

Apr. 15, 1998 (JP) ............................................ 10-105119

(51) Int. Cl.[7] .............................. B60T 8/44; B60T 11/00
(52) U.S. Cl. ..................................... 303/114.3; 188/356
(58) Field of Search .......................... 303/114.3, 113.3; 188/356, 357; 123/295

(56) References Cited

U.S. PATENT DOCUMENTS

| 3,799,303 A | 3/1974 | Stoltman |
| 3,947,073 A | 3/1976 | Cattaneo et al. |
| 4,899,708 A | 2/1990 | Jung |
| 5,332,056 A | * 7/1994 | Niibe et al. ............... 303/114.3 |
| 5,826,559 A | 10/1998 | Ichimoto et al. ............ 123/295 |
| 5,846,164 A | 12/1998 | Harada |
| 5,915,357 A | 6/1999 | Harada et al. |
| 5,950,594 A | 9/1999 | Mizuno |
| 5,950,595 A | 9/1999 | Yoshioka et al. |
| 6,006,716 A | 12/1999 | Harada et al. |
| 6,017,100 A | 1/2000 | Mizuno et al. ........... 303/114.3 |
| 6,095,116 A | 8/2000 | Matsushita et al. .......... 123/295 |

FOREIGN PATENT DOCUMENTS

DE 3140155 A1 10/1981

(List continued on next page.)

*Primary Examiner*—Jack Lavinder
*Assistant Examiner*—Thomas J. Williams
(74) *Attorney, Agent, or Firm*—Oliff & Berridge, PLC.

(57) ABSTRACT

A vacuum booster apparatus used for a brake apparatus positively decreases a degree of opening of a throttle valve when it is required while an unnecessary decrease in the degree of opening of the throttle valve is positively prevented. A first pressure chamber of a vacuum booster is connected to an intake pipe of the engine on a downstream side of a throttle valve. A second pressure chamber of the vacuum booster is selectively connectable to one of the first pressure chamber and atmosphere. The vacuum booster boosts an operating force applied to a brake operating member based on a pressure difference between the first pressure chamber and the second pressure chamber. A throttle-opening-degree control device controls a negative pressure in the first pressure chamber by controlling the degree of opening of the throttle valve. The throttle-opening-degree control device decreases the degree of opening of the throttle valve only for a limited time when the negative pressure in the first pressure chamber is smaller than a predetermined necessary negative pressure determined by an operating-force relating amount related to the operating force applied to the brake operating member.

3 Claims, 11 Drawing Sheets

FOREIGN PATENT DOCUMENTS

| | | |
|---|---|---|
| DE | 3937239 A1 | 11/1989 |
| DE | 19601418 A1 | 1/1996 |
| DE | 196 32 130 A1 | 1/1998 |
| EP | 833044 A2 | 4/1998 |
| JP | 56-59466 | 10/1954 |
| JP | 1-98059 | 6/1989 |
| JP | A-5-208663 | 8/1993 |
| JP | A-5-208665 | 8/1993 |
| JP | 7-69205 | 3/1995 |
| JP | A-7-247866 | 9/1995 |
| JP | 7-247886 | 9/1995 |
| JP | A-8-164840 | 6/1996 |
| JP | 8-165935 | 6/1996 |
| JP | A-8-318764 | 12/1996 |
| JP | 8-318764 | 12/1996 |
| JP | 10-73039 | 3/1998 |
| JP | 10-148150 | 6/1998 |
| JP | 10-151970 | 6/1998 |
| JP | 10-151971 | 6/1998 |
| JP | 10-151972 | 6/1998 |
| JP | 10-157606 | 6/1998 |
| JP | 10-167047 | 6/1998 |
| JP | 10-175464 | 6/1998 |
| JP | 10-310049 | 11/1998 |
| JP | 11-182278 | 7/1999 |

\* cited by examiner

[OFF STATE]

[ON STATE]

VACUUM BOOSTER APPARATUS AND A BRAKE APPARATUS

BACKGROUND OF THE INVENTION

1. Field of the Invention

The present invention relates to a vacuum booster apparatus and a brake apparatus including a vacuum booster.

2. Description of the Related Art

Japanese Laid-Open Patent Application No. 8-164840 discloses a vacuum booster apparatus provided with a vacuum booster. The vacuum booster comprises a first pressure chamber which is connected to an intake line of an engine at a position downstream of a throttle valve and a second pressure chamber which is selectively connectable to either the first pressure chamber or atmosphere. The vacuum booster boosts an operational force applied to a brake-operating member based on a difference between a pressure in the first pressure chamber and a pressure in the second pressure chamber. The vacuum booster apparatus also includes a throttle-opening-degree control apparatus which increases a negative pressure in the first pressure chamber by decreasing a degree of opening of the throttle valve. In the above-mentioned vacuum booster apparatus, when the negative pressure in the first pressure chamber becomes less than a predetermined negative pressure, the degree of opening of the throttle valve is decreased so as to maintain the negative pressure in the first pressure chamber at a pressure higher than the predetermined negative pressure. Accordingly, since the negative pressure in the first pressure chamber is maintained higher than the predetermined negative pressure whether or not the brake-operating member is being operated, a boost limit is prevented from being decreased. The boost limit is represented by a master cylinder pressure at a time when a boost action reaches a limit.

The above-mentioned engine having the throttle valve is a direct-injection-type gasoline engine in which gasoline is directly injected into cylinders. In this type of engine, a uniform combustion is performed when a load applied to the engine is large, that is, when an engine speed is high. On the other hand, when a load applied to the engine is not very large, that is, when the engine speed is medium or low, a stratified charge combustion is performed. In the uniform combustion, a combustion is achieved at a normal air-fuel ratio, that is, a stoichiometric air-fuel ratio. In the stratified charge combustion, an ultra lean burn occurs at a high air-fuel ratio of about 25 to 50. According to the ultra lean burn, a rate of fuel consumption is reduced which results in energy saving. When the engine load is medium or low, a necessary drive torque can be output even when the ultra lean burn occurs. Since, normally, the engine load is not very large when the brake operating member is being operated, the ultra lean burn is performed. In such the case, a degree of opening of the throttle valve is maintained at a relatively large degree so as to intake a large amount of air.

If the degree of opening of the throttle valve is maintained at a relatively large degree, the negative pressure in the first pressure chamber tends to be decreased. Accordingly, in the conventional vacuum booster apparatus, the degree of opening of the throttle valve is decreased when the negative pressure in the first pressure chamber is less than the predetermined negative pressure. When the degree of opening of the throttle valve is decreased, a state of combustion should be changed from the ultra lean burn to the uniform combustion. This is because an unstable combustion causing misfire occurs when the degree of opening of the throttle valve is decreased. Additionally, the change from a state of the ultra lean burn to a state of the uniform combustion is performed stepwisely (gradually). If an output torque is the same, an amount of injection of fuel, the degree of opening of the throttle valve and a degree of opening of a swirl port are considerably different between the state of the ultra lean burn and the state of the uniform combustion. Accordingly, when the state of the ultra lean burn is changed to the uniform combustion, these conditions are considerably changed, which results in deterioration of drivability. Similarly, the return from the state of the uniform combustion to the state of the ultra lean burn is performed stepwisely. As mentioned above, when the degree of opening of the throttle valve is decreased when the ultra lean burn is being performed, it is required to stepwisely or gradually change the ultra lean burn to the uniform combustion. This causes deterioration in a rate of fuel consumption. Accordingly, it is not preferable to decrease the degree of opening of the throttle valve so as to maintain a negative pressure in the first pressure chamber in a state in which the ultra lean burn is performed. Additionally, a frequency of such a change in the state of combustion should be as small as possible. On the other hand, when a braking operation is not being performed, there is a possibility that the uniform combustion is performed. In such a case, the rate of fuel consumption is not decreased by much even if the degree of opening of the throttle valve is decreased.

If the predetermined negative pressure at which the degree of opening of the throttle valve is decreased can be decreased, that is, if the predetermined negative pressure can be set closer to an atmospheric pressure, a frequency of the degree of opening of the throttle valve being decreased can be decreased. However, in such a case, the limit of boost is decreased. On the other hand, if the predetermined negative pressure is increased, that is, if the predetermined negative pressure is set closer to an absolute vacuum, the limit of boost can be increased. That is, the boosting function can be provided until an operational force applied to the brake-operating member is large. However, in such a case, the frequency of a degree of opening of the throttle valve being decreased is increased. Additionally, since the vacuum booster cannot reach the limit of boost even if the negative pressure is less than the predetermined negative pressure in a range where an operational force applied to the brake-operating member is small, the degree of opening of the throttle valve is decreased despite that the negative pressure is not required to be increased. As discussed above, in the above-mentioned vacuum booster apparatus, it is difficult to decrease a frequency of the degree of opening of the throttle valve being decreased while a necessary negative pressure is maintained in the first pressure chamber.

In the above-mentioned patent document, a vacuum booster apparatus which can decrease the frequency of the degree of opening of the throttle valve being decreased during a braking operation is also disclosed. This vacuum booster apparatus includes the above-mentioned vacuum booster and a throttle-valve-opening control apparatus. The throttle-valve-opening control apparatus increases a negative pressure in the first pressure chamber by decreasing the degree of opening of the throttle valve when the brake-operating member is continuously operated for a period longer than a predetermined period and when the negative pressure in the first pressure chamber is less than the predetermined negative pressure. In this vacuum booster apparatus, the degree of opening of the throttle valve is always decreased when the brake-operating member is continuously operated for a period longer than the predetermined period and when the negative pressure in the first pressure chamber is less than the predetermined negative pressure. However, when an operational force applied to the brake-operating member is small, the vacuum booster does not reach the limit of boost even if the braking operation continues for a long time and the negative pressure is small. In such a case, the negative pressure is not required to be increased. Additionally, when the operational force is large, the vacuum booster may reach the limit of boost even if the braking operation continues for only a short time. In such a case, the negative pressure should be increased. As discussed above, in the above-mentioned vacuum booster, the degree of opening of the throttle valve may be unnecessarily decreased or not decreased when it is required.

SUMMARY OF THE INVENTION

It is a general object of the present invention to provide a vacuum booster apparatus and a brake apparatus in which the above-mentioned problems are eliminated.

A more specific object of the present invention is to provide a vacuum booster apparatus and a brake apparatus which positively decreases a degree of opening of a throttle valve when it is required while an unnecessary decrease in the degree of opening of the throttle valve is positively prevented.

In order to achieve the above-mentioned objects, there is provided according to one aspect of the present invention a vacuum booster apparatus adapted to be used for a brake apparatus provided in a vehicle having an internal combustion engine, the vacuum booster apparatus comprising:

- a vacuum booster having a first pressure chamber and a second pressure chamber, the first pressure chamber being connected to an intake pipe of the engine on a downstream side of a throttle valve, the second pressure chamber being selectively connectable to one of the first pressure chamber and atmosphere, the vacuum booster boosting an operating force applied to a brake operating member based on a pressure difference between the first pressure chamber and the second pressure chamber; and
- a throttle-opening-degree control device controlling a negative pressure in the first pressure chamber by controlling a degree of opening of the throttle valve,
- wherein the throttle-opening-degree control device includes limited-time opening-degree decreasing means for decreasing the degree of opening of the throttle valve only for a limited time when the negative pressure in the first pressure chamber is smaller than a predetermined necessary negative pressure determined by an operating force relating amount related to the operating-force applied to the brake operating member.

According to the present invention, the operating force relating amount is related to the operating force applied to the brake operating member such as a brake pedal. That is, the operating force relating amount includes the operating force itself and an amount in which the operating force is reflected such as a travel of the brake operating member or a master cylinder pressure.

In the vacuum booster apparatus according to the present invention, the predetermined necessary negative pressure is determined in accordance with the operating force relating amount that relates to the operating force applied to the brake operating member. That is, the predetermined necessary negative pressure is stepwisely or gradually increased as the operating-force relating amount is increased. Additionally, the degree of opening of the throttle valve is decreased only when the negative pressure in the first pressure chamber is smaller than the predetermined necessary negative pressure.

The vacuum booster is closer to its boost limit when the operating-force relating amount is large than when the operating-force relating amount is small. Accordingly, when the operating-force relating amount is large, the negative pressure in the first pressure chamber is preferably increased so as to increase a boost limit of the vacuum booster so that the vacuum booster is prevented from reaching its boost limit. On the other hand, when the operating force relating amount is small, there is no need to increase the boost limit. That is, it is not required to increase the negative pressure in the first pressure chamber. According to the vacuum booster apparatus of the present invention, since the predetermined necessary negative pressure is determined in accordance with the operating-force relating amount, the degree of opening of the throttle valve can be decreased only when it is necessary.

In the vacuum booster apparatus according to the present invention, the limited-time opening-degree decreasing means may include necessary-negative-pressure determining means for determining the predetermined necessary negative pressure in accordance with an operating-force relating amount related to the operating force applied to the brake operating member.

The predetermined necessary negative pressure may be determined by the operating-force relating amount alone or with other conditions of a braking operation such as a period of operating the brake operating member and a rate of increase in the operating-force relating amount.

Additionally, in the vacuum booster apparatus according to the present invention, the limited-time opening degree decreasing means may include means for determining the predetermined necessary negative pressure in accordance with a rate of increase in an operating-force relating amount related to the operating force applied to the brake operating member.

According to this invention, the predetermined necessary negative pressure is determined according to the operating force relating amount and the rate of increase in the operating-force relating amount. That is, the predetermined necessary negative pressure is increased as the rate of increase is increased. Thus, if the operating-force relating amount is the same, the predetermined necessary negative pressure when the rate of increase in the operating force relating amount is large is set to be greater than when the rate of increase in the operating-force relating amount is small.

When the rate of increase in the operating-force relating amount is large, a rate of evacuation of air in the first pressure chamber is preferably increased so as to maintain an appropriate operational speed of the vacuum booster. On the other hand, when the rate of increase in the operating-force relating amount is small, there is no need to increase the predetermined necessary negative pressure. Accordingly, when the operating-force relating amount is the same, the predetermined necessary negative pressure when the rate of increase in the operating-force relating amount is large is preferably set to be greater than when the rate of increase in the operating force relating amount is small.

Additionally, the rate of increase in the operating force relating amount is set to be a large value when it is required to rapidly decrease a speed of a vehicle. In such a case, a possibility for the vacuum booster reaching it boost limit is high. Thus, it is preferable to increase the negative pressure in the first pressure chamber. On the other hand, when the rate of increase in the operating-force relating amount is small, the possibility for the vacuum booster reaching its boost limit is low. In this case, there is no problem if the negative pressure in the first pressure chamber is small. Particularly, when an operating force applied to the brake operating member is released, the rate of increase in the operating-force relating amount becomes a negative value. In this case, the possibility for the vacuum booster reaching its boost limit is low. That is, a margin to the boost limit when the rate of increase in the operating-force relating amount is large is smaller than when the rate of increase in the operating-force relating amount is small.

Additionally, in the vacuum booster apparatus according to the present invention, the limited-time opening degree decreasing means may decrease the degree of opening of the throttle valve only when a boost limit of the vacuum booster is smaller than an operational state value which is determined according to an operating-force relating amount related to the operating force applied to the brake operating member.

The boost limit of the vacuum booster is equal to the master cylinder pressure at a time when a boost action of the vacuum booster reaches its limit. Accordingly, the operational state value can be the master cylinder pressure as the operating force relating amount at that time. Additionally, the operational state value can be set as other values such as the operating-force applied to the brake operating member corresponding to the master cylinder pressure or a travel of the brake operating member. Further, the operational state value can be a value determined by the operating-force relating amount and the rate of increase in the operating force relating amount.

The boost limit of the vacuum booster is determined by a pressure difference between the first pressure chamber and the second pressure chamber when the pressure in the second pressure chamber reaches an atmospheric pressure. The boost limit is increased as the pressure difference is increased. The pressure difference is increased as the negative pressure in the first pressure chamber is increased. Accordingly, the boost limit is increased as the negative pressure in the first pressure chamber is increased. A level of the negative pressure in the first pressure chamber needed for increasing the boost limit to be greater than the operational state value is determined by a level of the operational state value, and such a negative pressure is referred to as a boosting-time necessary minimum negative pressure. If the degree of opening of the throttle valve is decreased only when the boost limit is smaller than the operational state value, the negative pressure in the first pressure chamber can be maintained to be greater than the boosting-time necessary minimum negative pressure. Thus, measures should be taken for a decrease in the degree of opening of the throttle valve only when the negative pressure in the first pressure chamber is smaller than the boosting-time necessary minimum negative pressure.

Additionally, there is provided according to another aspect of the present invention a vacuum booster apparatus adapted to be used for a brake apparatus provided in a vehicle having an internal combustion engine, the vacuum booster apparatus comprising:

a vacuum booster having a first pressure chamber and a second pressure chamber, the first pressure chamber being connected to an intake pipe of the engine on a downstream side of a throttle valve, the second pressure chamber being selectively connectable to one of the first pressure chamber and atmosphere, the vacuum booster boosting an operating force applied to a brake operating member based on a pressure difference between the first pressure chamber and the second pressure chamber; and a throttle-opening-degree control device controlling a degree of opening of the throttle valve in accordance with a negative pressure in the first pressure chamber and at least one of an operating-force relating amount related to the operating force applied to the brake operating member and a rate of increase in the operating-force relating amount.

In the vacuum booster apparatus according to this invention, the degree of the throttle valve is controlled based on the negative pressure in the first chamber and at least one of the operating-force relating amount and the rate of increase in the operating-force relating amount. For example, the degree of opening of the throttle valve may be decreased when the negative pressure in the first pressure chamber is smaller than a preset negative pressure and when the operating-force relating amount is greater than a preset amount, or when the operating-force relating amount is greater than a preset amount and the rate of increase in the operating-force relating amount is greater than a preset rate. In any case, the degree of opening of the throttle valve is decreased only when the negative pressure in the first pressure chamber is required to be increased. Thus, a frequency of operations for decreasing the degree of opening of the throttle valve can be decreased.

Additionally, there is provided according another aspect of the present invention a vacuum booster apparatus adapted to be used for a brake apparatus provided in a vehicle having an internal combustion engine, the vacuum booster apparatus comprising:

a vacuum booster having a first pressure chamber and a second pressure chamber, the first pressure chamber being connected to an intake pipe of the engine on a downstream side of a throttle valve, the second pressure chamber being selectively connectable to one of the first pressure chamber and atmosphere, the vacuum booster boosting an operating force applied to a brake operating member based on a pressure difference between the first pressure chamber and the second pressure chamber; and a throttle-opening-degree control device controlling a negative pressure in the first pressure chamber by controlling a degree of opening of the throttle valve, wherein the throttle-opening-degree control device includes large-change-time opening degree decreasing means for decreasing the degree of opening of the throttle valve as a rate of increase in an operating-force relating amount related to the operating force applied to the brake operating member is increased.

The negative pressure in the first pressure chamber needed to be increased more when the rate of increase in the operating-force relating amount is large as compared to when the rate of increase is small.

In the conventional vacuum booster apparatus, the degree of opening of the throttle valve is decreased when an operation of the brake operating member continues longer than a preset time and when the negative pressure in the first pressure chamber is smaller than a preset negative pressure. However, when a rapid braking operation is performed, that is, when the rate of increase in the operating force relating amount is large, the negative pressure in the first pressure chamber must be increased even if the operation of the brake operating member continues a short time. Yet, in such a case, the degree of opening of the throttle valve is not decreased. n the other hand, when the rate of increase in the operating-force relating amount is small, that is, for example, when the operating force applied to the brake operating member is released (the rate of increase is a negative value), the degree of opening of the throttle valve is decreased although the negative pressure in the first pressure chamber could be small. In order to eliminate such an inconvenience, in the vacuum booster apparatus according to this invention, the degree of opening of the throttle valve when the rate of increase in the operating-force relating amount is large is decreased more than when the rate of increase in the operating force relating amount is small. Thus, the degree of opening of the throttle valve is decreased only when it is necessary.

In the above-mentioned invention, the throttle-opening-degree control device may further include increasing-rate-related limited-time opening-degree decreasing means for decreasing the degree of opening of the throttle valve only for a limited time when the negative pressure in the first pressure chamber is smaller than a predetermined necessary negative pressure determined according to the rate of increase in the operating-force relating amount.

Additionally, there is provided according to another aspect of the present invention a vacuum booster apparatus adapted to be used for a brake apparatus provided in a vehicle having an internal combustion engine, the vacuum booster apparatus comprising:

a vacuum booster having a first pressure chamber and a second pressure chamber, the first pressure chamber being connected to an intake pipe of the engine on a downstream side of a throttle valve, the second pressure chamber being selectively connectable to one of the first pressure chamber and atmosphere, the vacuum booster boosting an operating force applied to a brake operating member based on a pressure difference between the first pressure chamber and the second pressure chamber; and a throttle-opening-degree control device controlling a negative pressure in the first pressure chamber by controlling a degree of opening of the throttle valve, wherein the throttle-opening-degree control device includes operating-time opening-degree-decrease suppressing means for suppressing a decrease in the degree of opening of the throttle valve so that the decrease in the degree of opening of the throttle valve when the brake operating member is being operated is smaller than when the brake operating member is not being operated.

When a braking operation is being performed, the second pressure chamber is alternately connected to either the first pressure chamber or atmosphere. Accordingly, the negative pressure in the first pressure chamber is decreased as the braking operation continues. If the negative pressure in the first pressure chamber is sufficiently increased before the braking operation is performed, that is, when a braking operation is not being performed, the negative pressure in the first pressure chamber can be maintained at a sufficient level for a long time. That is, the negative pressure in the first pressure chamber can be prevented from being smaller than the predetermined necessary negative pressure if the negative pressure in the first pressure chamber is increased when a braking operation is not being performed. Accordingly, a frequency of operations for decreasing the degree of opening of the throttle valve can be deceased when a braking operation is being performed.

As discussed above, if the degree of opening of the throttle valve is decreased when a braking operation is being performed, that is, the ultra lean burn is performed, a rate of fuel consumption is increased. However, according to the vacuum booster apparatus of this invention, since a frequency of operations for decreasing the degree of opening of the throttle valve is decreased, an increase in the rate of fuel consumption can be suppressed.

Additionally, when the negative pressure in the first pressure chamber is increased when a braking operation is being performed, a braking force is increased if the operating force applied to the brake operating member by a driver is constant. In order to maintain a constant braking force, the driver must control the operating force. This deteriorates a brake feel given to the driver. In order to eliminate such an inconvenience, in the vacuum booster apparatus according to this invention, a frequency of operations for decreasing the degree of opening of the throttle valve is decreased so that the operation for decreasing the degree of opening of the throttle valve is rarely performed when a braking operation is being performed. Thus, there is an advantage in that deterioration of a braking feel is prevented.

In the vacuum booster apparatus according to the above-mentioned invention, the throttle-opening-degree control device may include opening-degree decreasing means for decreasing the degree of opening of the throttle valve when the negative pressure in the first pressure chamber is smaller than a preset negative pressure, and the operating-time opening-degree-decrease suppressing means may include operating-time preset-negative-pressure decreasing means for decreasing the preset negative pressure so that the preset negative pressure when the brake operating member is being operated is smaller than that when the brake operating member is not being operated.

When a braking operation is not being performed, the degree of opening of the throttle valve is decreased when the negative pressure in the first pressure chamber is smaller than a non-operating-time preset negative pressure. When a braking operation is being performed, the degree of opening of the throttle valve is decreased when the negative pressure in the first pressure chamber is smaller than an operating-time preset negative pressure, which is smaller than the non-operating-time preset negative pressure. Since the operating-time preset negative pressure is smaller than the non-operating-time preset negative pressure, a start condition to start a decreasing operation for the degree of opening of the throttle valve when a braking operation is being performed tends to be unsatisfied as compared to that when a braking operation is not being performed. That is, a frequency of operations for decreasing the degree of opening of the throttle valve is decreased since the non-operating-time preset negative pressure is set to be a relatively large value.

Each of the operating-time preset negative pressure and the non-operating-time preset negative pressure may be either a fixed value or a variable value determined according to an operational state of the brake a operating member.

For example, the operating-time preset negative pressure may be set to a value at which the vacuum booster does not reach its boost limit when the brake operating member is operated by a normal operating force, and the non-operating-time preset negative pressure may be set to a value at which the vacuum booster does not reach its boost limit even when the negative pressure in the first pressure chamber becomes small due to the brake operating member being operated by a normal operating force. In such a case, the non-operating-time preset negative pressure is set to be greater than the operating-time preset negative pressure by an amount of decrease in the negative pressure when a normal braking operation is performed.

Additionally, the operating-time preset negative pressure may be set to the above-mentioned predetermined necessary negative pressure. The non-operating-time preset negative pressure may be a fixed value or a variable value. For example, the non-operating-time preset negative pressure may be set to a value greater than a maximum operating-time preset negative value during a previous braking operation by the above-mentioned amount of decrease in the negative pressure when a normal braking operation is performed. Additionally, the non-operating-time preset negative pressure may be set to a value corresponding to a running state of the vehicle. That is, the non-operating-time preset negative pressure when a vehicle speed is large may be set to be greater than that when the vehicle speed is low, or the non-operating-time preset negative pressure when a vehicle is running up a slope may be set to be greater than that when the vehicle is running down a slope.

Additionally, in the vacuum booster apparatus according to the above-mentioned invention, the operating-time preset-negative-pressure decreasing means may include operating-time preset-negative-pressure determining means for determining the preset negative pressure used when the brake operating member is being operated in accordance with at least one of an operating-force relating amount related to the operating force applied to the brake operating member and a rate of increase in the operating-force relating amount.

When a braking operation is being performed, the degree of opening of the throttle valve is decreased only when the negative pressure in the first pressure chamber is smaller than the operating-time preset negative pressure (hereinafter referred to as a variable preset negative pressure) which is determined based on at least one of the operating-force relating amount and the rate of increase in the operating-force relating amount. When the variable preset negative pressure is smaller than the operating-time preset necessary negative pressure (hereinafter referred to as a fixed preset negative pressure) which is previously determined as mentioned above, a frequency of operations for decreasing the degree of opening of the throttle valve can be further decreased.

Additionally, the operating-time preset negative pressure may be selectively set to one of the variable preset negative pressure and the fixed preset negative pressure. For example, if the degree of opening of the throttle valve is decreased when the negative pressure in the first pressure chamber becomes smaller than the one of the variable preset negative pressure and the fixed preset negative pressure which is greater than the other, the vacuum booster can be prevented from reaching its boost limit when the brake operating member is being operated with a large operating force. In such a case, the fixed preset negative pressure can be determined to be a minimum negative pressure in the first pressure chamber.

Additionally, there is provided according to another aspect of the present invention a brake apparatus adapted to be provided in a vehicle having an internal combustion engine, the brake apparatus comprising:

a vacuum booster having a first pressure chamber and a second pressure chamber, the first pressure chamber being connected to an intake pipe of the engine on a downstream side of a throttle valve, the second pressure chamber being selectively connectable to one of the first pressure chamber and atmosphere, the vacuum booster boosting an operating force applied to a brake operating member based on a pressure difference between the first pressure chamber and the second pressure chamber;

a braking-force assisting apparatus increasing a braking force to a value greater than a value corresponding to an output of the vacuum booster; and a throttle-opening-degree control device controlling a degree of opening of the throttle valve, the throttle-opening-degree control device including abnormal-time throttle-opening-degree decreasing means for decreasing the degree of opening of the throttle valve, when an abnormality occurs in the braking force assisting apparatus, so as to increase a negative pressure in the first pressure chamber.

In the above-mentioned invention, the braking-force assisting apparatus may increase a braking force after the vacuum booster reaches its boost limit or before the vacuum booster reaches its boost limit. As for the braking-force assisting device which increases a braking force before the vacuum booster reaches its boost limit, there is a type which increases a braking force when an emergency braking operation is performed and a type which increases a braking force a predetermined period before the vacuum booster reaches its boost limit. If the vacuum booster is a type in which a boost ratio changes before the vacuum booster reaches its boost limit, a braking force is increased at a time when the boost ratio is changed. In any case, in a brake apparatus provided with a braking-force assisting apparatus, a necessity for decreasing the degree of opening of the throttle valve is high when an abnormality occurs in the braking-force assisting apparatus, and is low when the braking-force assisting apparatus is normal.

The braking-force assisting apparatus may comprise a reservoir, a pump which pressurizes the brake fluid in the reservoir and provides the pressurized brake fluid to a brake cylinder, a motor for driving the pump, a pressure control device which can control the fluid pressure in the brake cylinder by the brake fluid discharged by the pump and braking-force controlling means for controlling the fluid pressure in the brake cylinder by controlling the motor and the pressure control device. When an abnormality occurs in the motor or the pressure control device, or when the an abnormality occurs in an electric system such as in the braking-force controlling means, it is determined that an abnormality occurs in the braking-force assisting apparatus. An abnormality occurring in the braking-force assisting apparatus can be detected by an abnormality detecting device.

A description will now be given of a case in which a braking force is increased after the vacuum booster reaches substantially an atmospheric pressure.

When the braking-force assisting apparatus is normal, a braking force can be increased after the vacuum booster reaches its boost limit. However, when an abnormality occurs in the braking force assisting apparatus, a braking force cannot be increased. In such a case, the boost limit of the vacuum booster can be increased by increasing the negative pressure in the first pressure chamber. If the brake operating member is operated with a large operating force, the vacuum booster is prevented from reaching its boost limit and the operating force is boosted by the vacuum booster which results in an increase in the braking force. On the other hand, when the braking-force assisting apparatus is normal, the braking force can be increased after the vacuum booster reaches its limit without increasing the boost limit of the vacuum booster. Thereby, the negative pressure in the first pressure chamber is not required to be increased.

When the braking-force assisting apparatus is abnormal, the degree of opening of the throttle valve may be decreased when the negative pressure in the first pressure chamber is smaller than the preset negative pressure, or may be decreased either when the negative pressure in the first pressure chamber is smaller or greater than the preset negative pressure. The above-mentioned preset negative pressure may be a predetermined fixed value or a variable value which is determined by the operating-force relating amount related to the operating force applied to the brake operating member.

The braking-force assisting apparatus may be any apparatus which increases a braking force after the vacuum booster reaches its boost limit. That is, the braking-force assisting apparatus may be an apparatus which increases a braking force to a value corresponding to an operating force applied to the brake operating member, or may be an apparatus which increases a braking force independent of an operating force applied to the brake operating force. Additionally, the fact that the vacuum booster has reached its boost limit can be detected by a boost-limit detecting device which detects the pressure in the second pressure chamber having reached an atmospheric pressure or detects the master cylinder pressure having reached a boost limit which can be obtained according to the negative pressure in the first pressure chamber.

It should be noted that even in the brake apparatus according to the present invention, a decrease of the degree of opening of the throttle valve cannot be completely omitted when the braking-force assisting apparatus is normal. When the braking force assisting apparatus is abnormal, the degree of opening of the throttle valve is decreased due to an abnormality occurring in the braking-force assisting apparatus. The degree of opening of the throttle valve may be decreased, when the braking-force assisting apparatus is normal, due to other causes such as a case in which the negative pressure in the first pressure chamber is smaller than the predetermined necessary negative pressure which is determined according to the operating-force relating amount related to the operating force applied to the brake operating force. In such a case, when the braking-force assisting apparatus is abnormal, the degree of opening of the throttle valve is decreased by the abnormal-time throttle opening degree decreasing means, and when the braking-force assisting apparatus is normal, the degree of opening of the throttle valve is decreased by the limited-time opening-degree decreasing means. In a case in which a braking force is increased after the vacuum booster reaches its boost limit, if the boost limit is increased when the braking force assisting apparatus is normal, a frequency of the vacuum booster reaching its boost limit can be decreased which results in a decrease in a frequency of operation of the braking-force assisting apparatus.

In the brake apparatus according to the present invention, the braking-force assisting apparatus may increase the braking force after a pressure in the second pressure chamber reaches substantially an atmospheric pressure, and the abnormal-time throttle-opening-degree decreasing means may determine the degree of opening of the throttle valve in accordance with a target boost limit.

According to this invention, the degree of opening of the throttle valve which degree is decreased when the braking-force assisting apparatus is abnormal, is determined by the abnormal-time throttle-opening-degree determining means. During an abnormal time in which the throttle valve is maintained at a degree of opening, the negative pressure in the first pressure chamber when the abnormal-time throttle opening degree is small can be greater than that when the abnormal-time throttle opening degree is large. That is, the abnormal-time throttle-opening degree when the target boost limit (corresponds to the negative pressure in the first pressure chamber) is large is determined to be smaller than that when the target boost limit is small.

Additionally, together with or instead of the abnormal-time throttle opening degree, a decreased-state maintaining time which is a period for maintaining a state in which the degree of opening of the throttle valve is small may be determined. A level of the negative pressure in the first pressure chamber is not increased, immediately after the degree of opening of the throttle valve is decreased, to a level corresponding to the degree of opening of the throttle valve. Accordingly, the negative pressure in the first pressure chamber and the boost limit when the decreased-state maintaining time is long is greater than that when the decreased-state maintaining time is short. In such a case, the abnormal-time throttle-opening-degree decreasing means includes opening-degree decreased-state-maintaining determining means.

In the brake apparatus according to the present invention, the braking-force assisting apparatus may increase the braking force after a pressure in the second pressure chamber reaches substantially an atmospheric pressure, and the abnormal-time throttle-opening-degree decreasing means decreases the degree of opening of the throttle valve when the negative pressure in the first pressure chamber is smaller than a predetermined necessary negative pressure which is determined in accordance with at least one of an operating-force relating amount related to the operating force applied to the brake operating member and a rate of increase in the operating-force relating amount.

In the brake apparatus according to this invention, the degree of opening of the throttle valve is decreased when the braking-force assisting apparatus is abnormal and when the negative pressure of the first pressure chamber is smaller than the predetermined necessary negative pressure. That is, if the braking-force assisting apparatus is abnormal, the negative pressure in the first pressure chamber is not required to be increased when the vacuum booster does not reach its boost limit or when a possibility for the vacuum booster reaching its boost limit is low. Thus, in the brake apparatus according to the present invention, a frequency of operations for decreasing the degree of opening of the throttle valve can be decreased.

Additionally, in the brake apparatus according to the present invention, the abnormal-time throttle-opening-degree decreasing means may decrease the degree of opening of the throttle valve when the brake operating member is not being operated and when the negative pressure in the first pressure chamber is smaller than a non-operating-time preset negative pressure, and the abnormal-time throttle opening degree decreasing means may also decrease the degree of opening of the throttle valve when the brake operating member is being operated and when the negative pressure in the first pressure chamber is smaller than an operating-time preset negative pressure which is smaller than the non-operating-time preset negative pressure.

As mentioned above, the degree of opening of the throttle valve does not have to be decreased immediately after an abnormality occurs in the braking-force assisting apparatus, and may be decreased when the negative pressure in the first pressure chamber becomes smaller than the non-operating time preset negative pressure or the operating-time preset negative pressure.

Additionally, in the brake apparatus according to the present invention, the throttle-opening-degree control device may include normal-time conditioned throttle-opening-degree decreasing means for decreasing the degree of opening of the throttle valve when the braking-force assisting apparatus is normal and when the negative pressure in the first pressure chamber satisfies a predetermined condition.

According to this invention, the degree of opening of the throttle valve is decreased by the abnormal-time throttle-opening-degree decreasing means when the braking force assisting apparatus is abnormal, and the degree of opening of the throttle valve is decreased by the normal-time conditioned throttle-opening-degree decreasing means when the braking-force assisting apparatus is normal. The normal-time conditioned throttle-opening-degree decreasing means may include at least one of the limited-time opening-degree decreasing means, the large-change-time opening-degree decreasing means and the operating-time opening-degree-decrease suppressing means.

In a case in which the braking-force assisting apparatus increases a braking force after the pressure in the second pressure chamber reaches substantially an atmospheric pressure, a frequency of operations of the braking-force assisting apparatus can be decreased if the boost limit of the vacuum booster is increased by decreasing the degree of opening of the throttle valve when the braking-force assisting apparatus is normal. Thus, when the braking force assisting apparatus includes a pump, an operating noise of the pump can be reduced.

Additionally, there is provided according to another aspect of the present invention a brake apparatus adapted to be provided in a vehicle having an internal combustion engine, the brake apparatus comprising:

a vacuum booster having a first pressure chamber and a second pressure chamber, the first pressure chamber being connected to an intake pipe of the engine on a downstream side of a throttle valve, the second pressure chamber being selectively connectable to one of the first pressure chamber and atmosphere, the vacuum booster boosting an operating force applied to a brake operating member based on a pressure difference between the first pressure chamber and the second pressure chamber so as to output the boosted operating force to a master cylinder;

a brake cylinder operated by a fluid pressure generated by the master cylinder;

a pressure-increasing device increasing a fluid pressure provided to the brake cylinder to be greater than the fluid pressure generated by the master cylinder; and a throttle-opening-degree control device controlling a degree of opening of the throttle valve, the throttle-opening-degree control device including abnormal-time throttle-opening-degree decreasing means for decreasing the degree of opening of the throttle valve, when an abnormality occurs in the pressure-increasing device, so as to increase a negative pressure in the first pressure chamber.

The above-mentioned pressure-increasing device can be a braking-force assisting apparatus which increases a braking force after the vacuum booster reaches its boost limit or an emergency-time braking-force assisting apparatus which increases a braking force at an emergency time. It is preferable that in a case in which the emergency-time braking-force is used, when the emergency-time braking force assisting apparatus is abnormal, the negative pressure in the first pressure chamber be set to be greater than a non-operating-time preset negative pressure used when a braking operation is not being performed. This is because a braking force can be increased when a large operating force is applied by a driver at an emergency time.

Other objects, features and advantages of the present invention will become more apparent from the following detailed description when read in conjunction with the accompanying drawings.

DETAILED DESCRIPTION OF THE PREFERRED EMBODIMENTS

Figure 1:
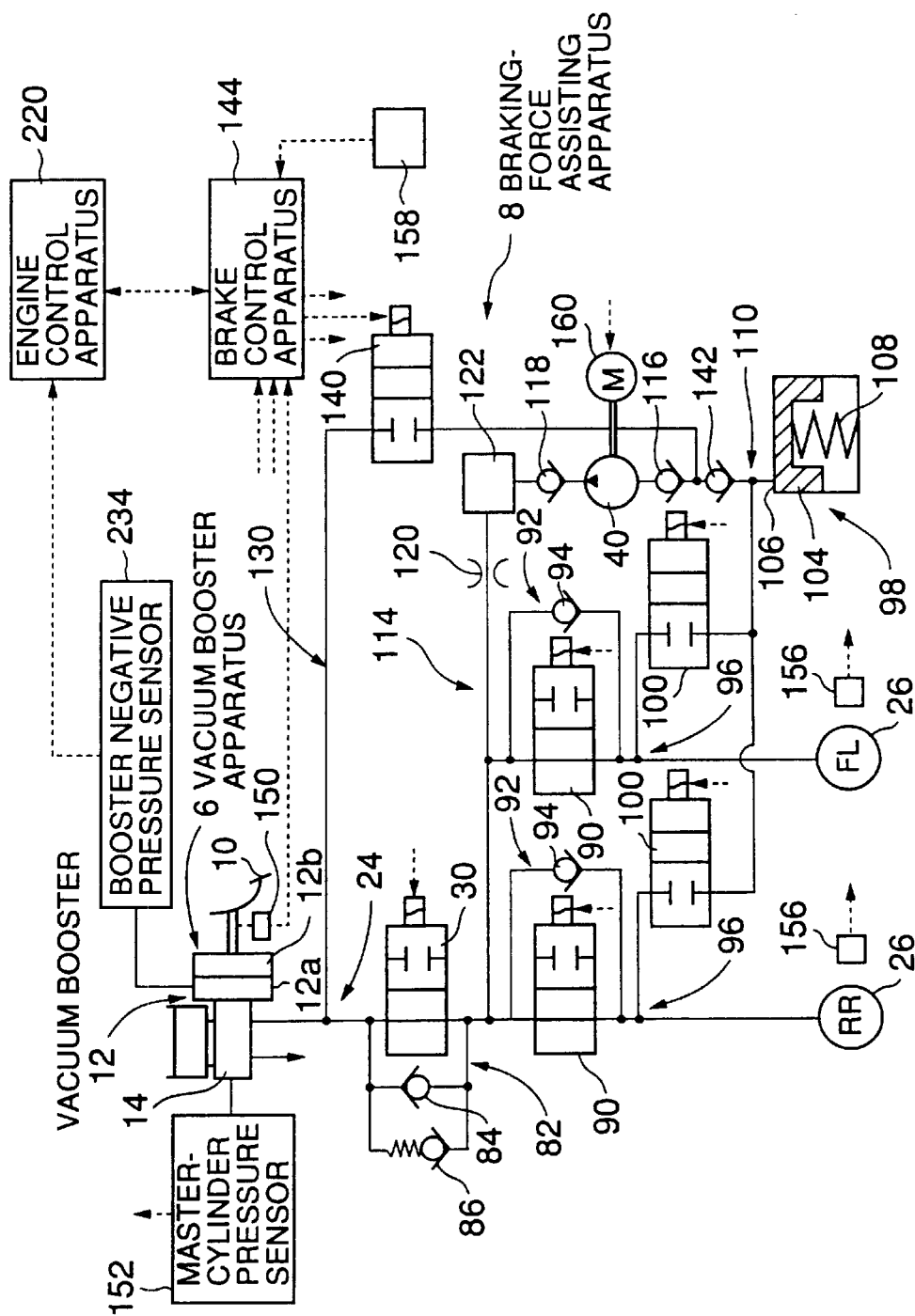
FIG. 1 is a structural diagram of a brake apparatus including a vacuum booster apparatus according to a first embodiment of the present invention.

A description will now be given, with reference to FIG. 1, of a first embodiment of the present invention. FIG. 1 is a structural diagram of a brake apparatus including a vacuum booster apparatus according to the first embodiment of the present invention.

The brake apparatus shown in FIG. 1 comprises a vacuum booster apparatus 6 and a braking-force assisting apparatus 8. A vacuum booster 12 included in the vacuum booster apparatus 8 has a limit of boost. Considering such a limit of boost, the braking-force assisting apparatus 8 controls a braking force so that a deceleration of a vehicle increases with an ideal slope relative to a brake operating force. The braking-force assisting apparatus 8 is operated by a pump 40. In the brake apparatus, an antilock control can be performed by using the pump 40 so as to prevent a tendency of lock of each wheel from being excessive when a braking operation is being performed.

In FIG. 1, a brake pedal 10 corresponds to a brake operating member. The brake pedal 10 is connected to a master cylinder 14 via the vacuum booster 12.

Figure 3:
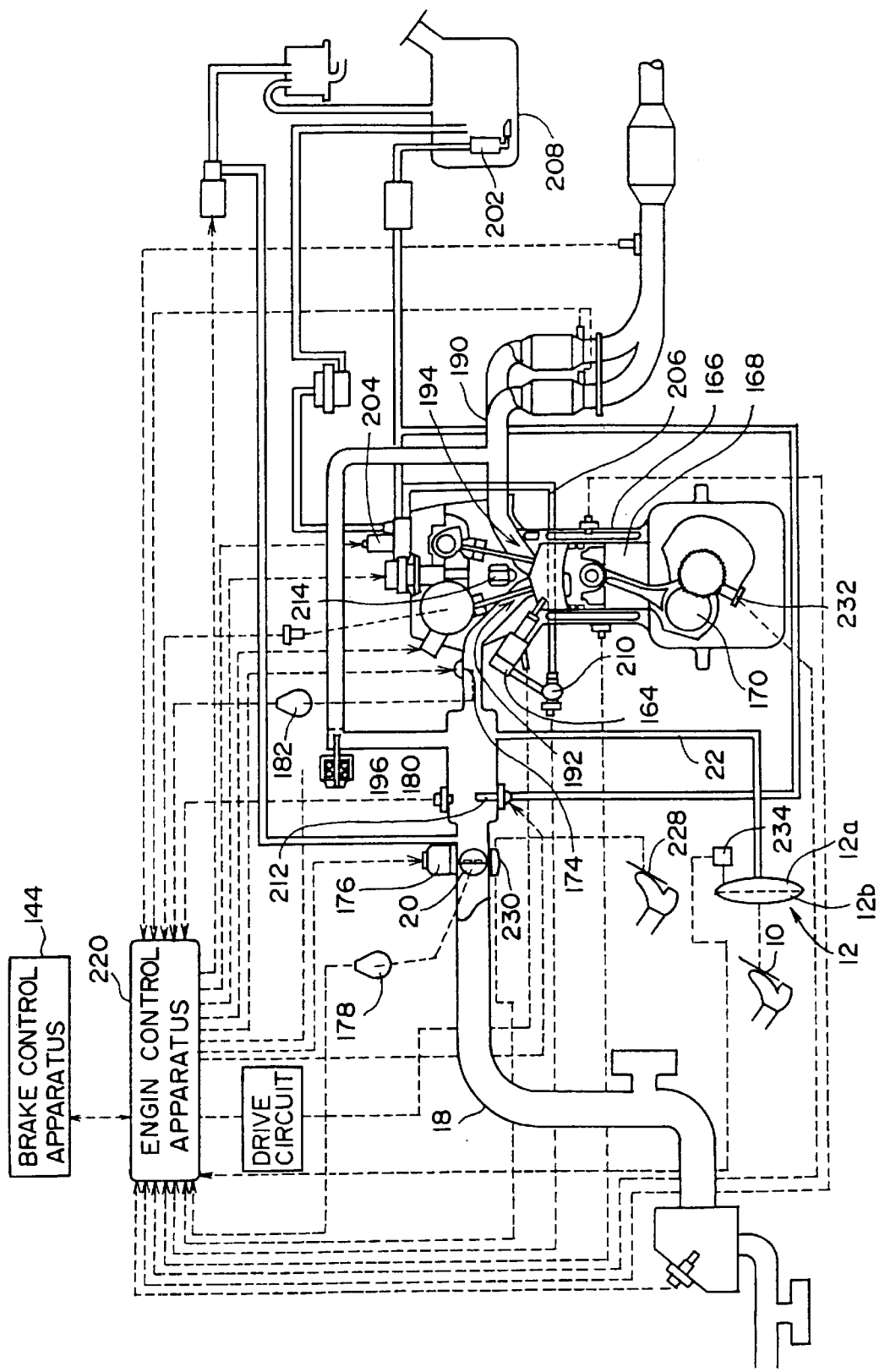
FIG. 3 is a structural diagram of an engine provided with a throttle valve which controls a negative pressure used by a vacuum booster shown in FIG. 1.

In the vacuum booster 12 (hereinafter referred to as booster 12), a power piston is movably provided within a housing having an inner space so as to form an airtight seal with an inner wall of the housing. The inner space of the housing of the vacuum booster 12 is divided by the power piston into a negative pressure chamber 12a corresponding to a first pressure chamber and a pressure changing chamber 12b corresponding to a second pressure chamber. The negative pressure chamber 12a is located on the master cylinder 14 side. The pressure changing chamber 12b is located on the brake pedal 10 side. The negative pressure chamber 12a is connected to an intake pipe 18 of an engine at a position downstream of a throttle valve 20 as shown in FIG. 3.

The master cylinder 14 is a tandem type which includes two pistons serially arranged and slidably fit within a housing so that the two pistons are moved by an output of the booster 12. The master cylinder 14 provides the same fluid pressure to each of chambers formed in front of the two pistons. A brake cylinder 26 operating a front left wheel FL and a brake cylinder 26 operating a rear right wheel RR are connected to one of the chambers, and a brake cylinder operating a front right wheel FR and a brake cylinder operating a rear left wheel RL are connected to the other of the chambers. The brake apparatus can be of a disc type or a drum type which restricts rotation of a wheel by pressing a friction member against a friction surface of a rotating member rotating with the wheel, a pressing force of the friction member being generated by a fluid pressure.

A fluid passage 24 extends from one of the chambers of the master cylinder 14. The fluid passage 24 is branched and the brake cylinders 26 of the front left and rear right wheels FL and RR are connected to respective ends of the branched fluid passage 24.

A pressure control valve 30 is provided on a master cylinder 14 side of a branched point of the fluid passage 24. The pressure control valve 30 controls a fluid pressure on the brake cylinder 26 side of the fluid passage 24 relative to a fluid pressure on the master cylinder 14 side. Specifically, if a pressure difference between the brake cylinder pressure and the master cylinder pressure is smaller than a target pressure difference in a state in which a brake fluid is discharged from the pump 40, the pressure control valve 30 prevents a flow of the brake fluid from the pump 40 to the master cylinder 14. On the other hand, if the pressure difference tends to be greater than the target pressure difference, the pressure control valve 30 permits the flow of brake fluid from the pump 40 to the master cylinder 14. Accordingly, the brake cylinder pressure is controlled by the pressure control valve 30 so that the brake cylinder pressure is greater than the master cylinder pressure and the pressure difference therebetween is equal to the target pressure difference.

Figure 2A:
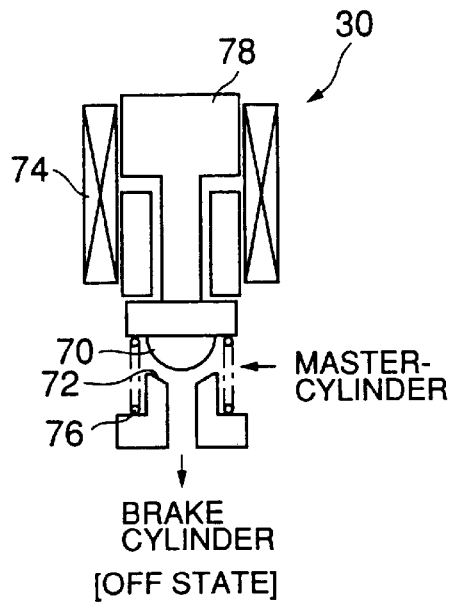
FIGS. 2A and 2B are illustrations for explaining a structure and an operation of a pressure control valve shown in FIG. 1.
Figure 2B:
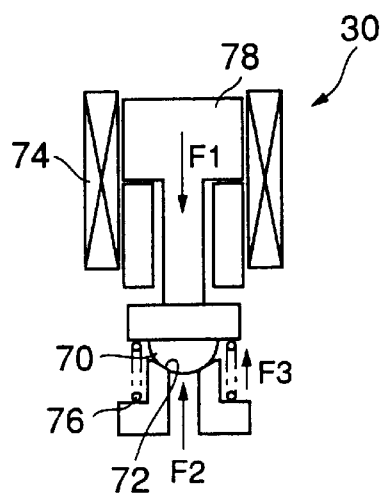

The pressure control valve 30 of the present embodiment is a type that electromagnetically controls the pressure difference between pressures in the brake cylinders 26 and the master cylinder 14. Specifically, as shown in FIGS. 2A and 2B, the pressure control valve 30 comprises a housing (not shown in the figure), a valve body 70, a valve seat 72 on which the valve body 70 sits and a solenoid 74 which generates a magnetic force so as to move the valve body 70 relative to the valve seat 72. The valve body 70 controls a state of the brake fluid flow in the fluid passage 24 between the master cylinder 14 and the brake cylinder 26.

In a non-operated state (OFF state) in which the solenoid 74 is not activated, the valve body 70 is separated from the valve seat 72 by a spring force of a spring 76. Thereby, flow of the brake fluid in the fluid passage 24 between the master cylinder 14 and the brake cylinders 26 is permitted in both directions. As a result, when a braking operation is performed, the brake cylinder pressure is changed in response to a change in the master cylinder pressure. During the braking operation, a force is exerted on the valve body 70 in a direction in which the valve body 70 is separated from the valve seat 72. Accordingly, as long as the solenoid 74 is not activated, the valve body 70 does not sit on the valve seat 72 even if the master cylinder pressure, that is, the brake cylinder pressure, is increased. That is, the pressure control valve 30 is a normally open valve.

On the other hand, in an operated state (ON state) in which the solenoid 74 is activated, an armature 78 is attracted by a magnetic force of the solenoid 74, and the valve body 70 (movable member) which moves together with the armature 78 is seated on the valve seat 72 (stationary member). At this time, as shown in FIG. 2B, the attracting force F1 and a force of a sum of forces F2 and F3 are exerted on the valve body 70 in opposite directions. The attracting force F1 is generated by the magnetic force generated by the solenoid 74. The force F2 is generated based on a pressure difference between the brake cylinder pressure and the master cylinder pressure. The spring force F3 is generated by the spring 76. A magnitude of the force can be represented by a product of the pressure difference between the brake cylinder pressure and the master cylinder pressure and an effective pressure receiving area of the valve body 70 which area receives the brake cylinder pressure.

In the operated state (ON state) in which the solenoid 74 is activated, and the discharge pressure of the pump 40, that is, the brake cylinder pressure, is sufficiently low such that a relationship F2≦F1−F3 is established, the valve body 70 is maintained to be seated on the valve seat 72. That is, the valve body 70 is maintained to be seated on the valve seat 72 when the pressure difference force F2 does not exceed the sum of the attracting force F1 and the spring force F3. In such a state, the brake fluid is prevented from flowing from the pump 40 to the master cylinder 14. Accordingly, the discharge pressure of the pump 40 is increased, and a fluid pressure higher than the master cylinder pressure is generated in the brake cylinders 26.

If the discharge pressure of the pump 40, that is, the brake cylinder pressure, is further increased such that a relationship F2>F1−F3 is established, the valve body 70 is separated from the valve seat 72. That is, when the sum of the pressure difference force F2 and the spring force F3 exceeds the attracting force F1, the valve body 70 is separated from the valve seat 72, and the brake fluid is provided from the pump 40 to the master cylinder 14. As a result, the discharge pressure of the pump 40, that is, the brake cylinder pressure, is prevented from being further increased. Accordingly, if the spring force F3 of the spring 76 is not considered, a brake cylinder pressure greater than the master cylinder pressure by the attracting force F1 of the solenoid is generated.

Additionally, the pressure control valve 30 is designed so that a magnitude of the attracting force F1 of the solenoid 74 changes linearly in response to a magnitude of an activating current I of the solenoid 74.

As shown in FIG. 1, a bypass passage 82 is provided to the pressure control valve 30. A check valve 84 is provided in the middle of the bypass passage 82. The check valve 84 is provided so as to keep a fluid flow from the master cylinder 14 to the brake cylinders 26 even if the pressure control valve 30 is closed due to a force exerted on the movable member in the pressure control valve 30 when the brake pedal 10 is being pressed. Additionally, a relief valve 86 is provided parallel to the check valve 84 so as to prevent a pressure built by the discharge pressure of the pump 40 from being excessive.

Pressure increasing valves 90, each of which is a normally open solenoid valve, are provided to the branched portion of the fluid passage 24 so as to achieve a pressure increasing state in which the brake fluid is prevented from flowing from the master cylinder 14 to the brake cylinders 26 when the pressure increasing valves 90 are closed. A bypass passage 92 is connected to each of the pressure increasing valves 90, and a check valve 94 is provided to each of the bypass passages 92. A reservoir passage 96 extends from a position between each of the pressure increasing valves 90 and the respective brake cylinder 26, and the reservoir passage reaches a reservoir 98. A pressure decreasing valve 100, which is a normally closed solenoid valve, is provided in the middle of each reservoir passage 96 so as to achieve a pressure decreasing state in which a flow of the brake fluid from the brake cylinders 26 to the reservoir 98 is permitted when the pressure decreasing valve 100 is open.

The reservoir 98 comprises a housing and a reservoir piston 104 slidably fit in the housing so a to form a substantially airtight seal with an inner wall of the housing. A reservoir chamber 106 is formed by the housing and the reservoir piston 104 so as to store the brake fluid in the reservoir chamber 106 under a pressure generated by a spring 108.

The reservoir 98 is connected to an inlet of the pump 40 via an inlet passage 110. An output of the pump 40 is connected to a portion of the fluid passage 24 between the pressure control valve 30 and the pressure increasing valves 90 via an outlet passage 114. An inlet valve 116 which is a check valve is provided to the inlet passage 110. An outlet valve 118 which is a check valve is provided to the outlet passage 114. Additionally, an orifice 120 and a fixed damper 122 are provided to the outlet passage 114 so as to reduce pulsation in the brake fluid pressure.

In the present embodiment, a supplementary passage 130 is provided to connect the master cylinder 14 and to the reservoir 98. A flow control valve 140 is provided to the supplementary passage 130. The flow control valve 140 is a normally closed solenoid valve which is opened when the brake fluid should be provided from the master cylinder 14 to the reservoir 98 and when the pump 40 is being operated so that the brake fluid flows from the master cylinder 14 to the reservoir 98. When it is not required to provide the brake fluid from the master cylinder 14 to the reservoir 98, the flow control valve 140 is closed so as to prevent the brake fluid from flowing from the master cylinder 14 to the reservoir 98, which flow permits an increase in the fluid pressure by the master cylinder 14. It is determined whether or not the brake fluid is required to be introduced from the master cylinder 14 based on a determination as to whether or not the brake fluid is present in the reservoir 98, which brake fluid is to be pumped up by the pump 40. When an antilock control is being performed, an accumulation of periods during which the pressure increasing valve 90 achieves the pressure increasing state is calculated. Additionally, an accumulation of periods during which the pressure decreasing valve 100 achieves the pressure decreasing state is calulated. An amount of brake fluid remaining in the reservoir 98 is estimated based on the pressure increasing time and the pressure decreasing time. As mentioned above, the flow control valve 140 is opened when the pump 40 is being operated and there is no brake fluid to be pumped up by the pump 40. Thereby, the brake fluid is prevented from being provided from the master cylinder 14 to the reservoir before the master cylinder pressure is sufficiently increased.

Additionally, the reservoir 98 is prevented from storing an excessive amount of brake fluid due to the brake fluid in the master cylinder 14 being directly suctioned during an antilock control.

The supplementary passage 130 does not directly connect the master cylinder 14 and the reservoir 98. That is, the supplementary passage 130 is connected to a middle portion of the inlet passage 110. A check valve 142 is provided between the middle portion and the reservoir 98 so as to prevent the brake fluid from flowing from the supplementary passage 130 to the reservoir 98. During a braking operation, before the brake fluid in the master cylinder 14 is provided to the reservoir 98 through the check valve 142 by the flow control valve 30 being opened, the brake fluid in the reservoir 98 can be pumped up by the pump 40. Accordingly, a quick response of the pump 40 can be achieved than pumping the brake fluid after a pressure in the reservoir 98 is decreased. Additionally, a load applied to the pump 40 is reduced which facilitates a reduction in a capacity of the pump 40.

The brake apparatus is controlled by a brake control apparatus 144. The brake control apparatus 144 comprises a microcomputer. An input of the micro computer is connected to a brake switch 150. Other inputs of the microcomputer are connected to a master-cylinder-pressure sensor 152, wheel speed sensors 156 and an abnormality detecting device 158. The brake switch 150 detects whether the brake pedal 10 is in an operated state. The master-cylinder-pressure sensor 152 detects the master cylinder pressure. The wheel speed sensor 156 detects a rotational speed of each wheel. The abnormality detecting device 158 detects whether the braking-force assisting apparatus 8 is normal or abnormal. An output of the microcomputer is connected to the solenoid 74 of the pressure control valve 30 and a solenoid of each of the solenoid valves 90, 100 and 140 via respective drive circuits. A ROM provided in the brake control apparatus 144 stores various sets of information including table information shown in FIG. 4 which table information indicates a relationship between a negative pressure in the negative pressure chamber 12a and a limit of boost, programs for controlling a degree of opening of the throttle valve 20 represented by flowcharts shown in FIGS. 8 and 9 and programs for controlling a braking force represented by a flowchart shown in FIG. 10.

The above-mentioned throttle valve 20 is provided in the engine shown in FIG. 3. The engine shown in FIG. 3 is a direct injection gasoline engine which is provided with a high-pressure swirl injector 164 so as to directly inject gasoline into a cylinder 166. A piston 168 is moved within the cylinder 166 due to combustion of gasoline, and, thereby, a crank 170 is driven.

The above-mentioned intake pipe 18 is connected to the cylinder 166 so that air is introduced into the cylinder 166 through the intake pipe 18. The throttle valve 20 and a swirl valve 174 are provided in the intake pipe 18. A vacuum hose 22 is connected to the intake pipe between the throttle valve 20 and the swirl valve 174. The throttle valve 20 is operated by a throttle motor 176 so that a degree of opening of the throttle valve 20 is controlled by controlling an operation of the throttle motor 176. An amount of intake air introduced into the cylinder 166 is controlled by controlling a degree of opening of the throttle valve 20. A negative pressure in the negative pressure chamber 12a of the booster 12 is also controlled by controlling the degree of opening of the throttle valve 20. The degree of opening of the throttle valve 20 is detected by a throttle position sensor 178. Similarly, the swirl valve 174 is controlled by an operation of a swirl motor

180. The degree of opening of the swirl valve 174 is detected by an SCV position sensor 182. The degree of opening of the swirl valve 174 is controlled so that a swirl of air (air flow) in the cylinder 166 is optimum for a state of combustion.

An exhaust pipe 190 is also connected to the cylinder 166. A gas generated in the combustion chamber is exhausted to atmosphere via a three-state catalytic converter.

An intake valve 192 and an exhaust valve 194 are provided to the intake pipe 18 and an opening of the exhaust pipe 190 at the cylinder 166, respectively. The intake valve 192 and the exhaust valve 194 are operated by rotation of a camshaft. In the present embodiment, a timing of the intake valve 192 is controllable.

An exhaust gas cleaning device is provided to a connecting passage which connects between the exhaust pipe 190 and the intake pipe 18 by bypassing the cylinder 166 so as to recirculate an exhaust, which is controlled in response to an operational state of the engine so that an amount of nitrogen oxide NOx is reduced. An amount of exhaust gas to be recirculated is controlled by an exhaust gas recirculation (EGR) valve 196.

The high-pressure swirl injector 164 is connected to a fuel tank 208 via a low-pressure pump 202, a high-pressure pump 204 and a high-pressure pipe 206. The gasoline stored in the fuel tank 208 is pumped by the low-pressure pump 202 and is pressurized by the high-pressure pump 204 so that a predetermined amount of pressurized gasoline is provided to the high-pressure swirl injector 164. The high-pressure swirl injector 164 is provided with a swirl nose from which gasoline is injected into the cylinder 166 so that the injected gasoline becomes fine mist. A fuel pressure sensor 210 is mounted in the middle of the high-pressure pipe 206 so as to detect a pressure of the gasoline to be provided to the high-pressure swirl injector 164. Additionally, gasoline pumped by the low-pressure pump 202 is provided to a low-temperature injector 212 provided to a middle portion of the intake pipe 18.

The high-pressure pump 204 is driven by a cam which operates the intake valve 192 so that gasoline is provided in association with an operation of the cam. The high-pressure pump 204 includes a solenoid valve so that an amount of gasoline delivered by the high-pressure pump 204 is controllable according to a state of activation of a solenoid of the solenoid valve.

The engine shown in FIG. 3 is controlled by an engine control apparatus 220. The engine control apparatus 220 comprises a microcomputer. Inputs of the microcomputer are connected to the throttle position sensor 178, the SCV position sensor 182 and the fuel pressure sensor 210. Additionally, an accelerator position sensor 230 which detects a degree of opening of an acceleration pedal 228, a crank position sensor 232 which detects a position of the crank 170 and a booster negative pressure sensor 234 which detects a negative pressure in the negative pressure chamber 12a of the booster 12 are connected to inputs of the microcomputer. An output of the microcomputer is connected to the throttle motor 176 and the swirl motor 180 via respective drive circuits (not shown in the figure).

An engine revolution speed is detected based on a crank position detected by the crank position sensor 232. A drive torque desired by a driver is determined based on a degree of opening of the accelerator detected by the accelerator position sensor 230. A ROM provided in the engine control apparatus 220 stores various programs including programs for controlling the degree of opening of the throttle valve 20. In the present embodiment, an amount of fuel injected by the high-pressure swirl injector 164, the degree of opening of the throttle valve 20, a degree of opening of the swirl valve 174, the degree of opening of the EGR valve 196, an intake valve timing and an ignition timing are controlled based on the engine revolution speed and a degree of opening of the accelerator.

In the engine associated with the present embodiment, the ultra lean burn (stratified charge combustion) is performed in a state in which the engine speed is not very high (in a state in which an engine load is not very large). On the other hand, a uniform combustion is performed in a state in which the engine speed is high (in a state in which the engine load is large). In the uniform combustion, a combustion is performed at an air-fuel ratio near a stoichiometric air-fuel ratio. However, in the ultra lean burn, a combustion is performed at a high air-fuel ratio of about 25 to 50. In a state in which an engine load is not very large, a necessary torque can be output even when the ultra lean burn occurs. During a braking operation, since an engine load is not very large, the ultra lean burn is performed in many cases. According to the ultra lean burn, a rate of fuel consumption is reduced which results in energy saving. During the ultra lean burn, a degree of opening of the throttle valve 20 is set to a relatively large value because a large amount of air is required to increase a air-fuel ratio in order to prevent misfire.

Figure 4:
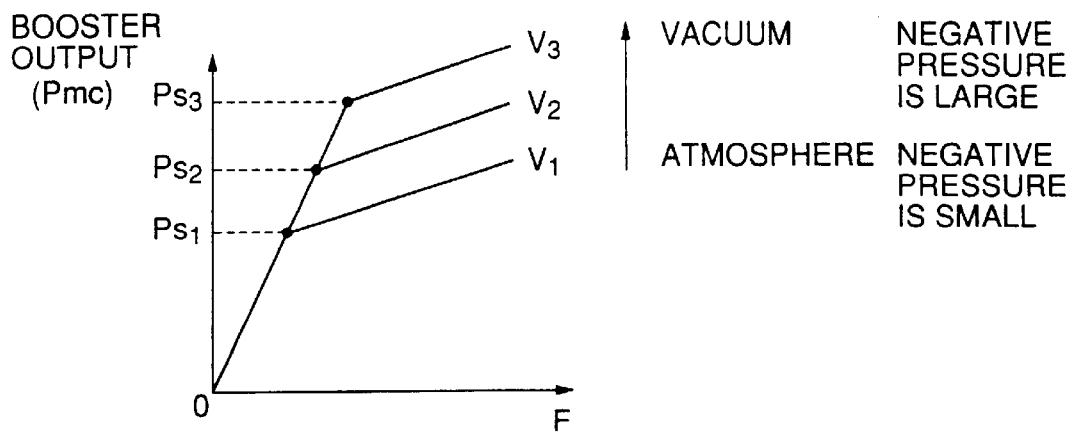
FIG. 4 is a graph showing a relationship between a negative pressure and a boost limit in the vacuum booster shown in FIG. 1.

However, since the negative pressure chamber 12a of the booster 12 is connected to the downstream side of the throttle valve 20, a negative pressure in the negative pressure chamber 12a is decreased when the degree of opening of the throttle valve 20 is set to a relatively large value. If the brake pedal 10 is pressed in a state in which the negative pressure of the negative pressure chamber 12a is small, the booster 12 reaches its boost limit even if the operating force to the brake pedal 10 is not very large. This cannot provide a sufficient boost action. As shown in FIG. 4, when the negative pressure is decreased, the boost limit is also decreased. In the present embodiment, to increase the negative pressure of the negative pressure chamber 12a, the degree of opening of the throttle valve 20 is decreased. When the degree of opening of the throttle valve 20 is decreased while the ultra lean burn is performed, the combustion is stepwisely or gradually changed from the ultra lean burn to a uniform combustion so that the degree of opening of the throttle valve 20 is decreased in a state of uniform combustion. This is because if the degree of opening of the throttle valve 20 is decreased during the ultra lean burn, a state of combustion becomes unstable due to misfire or the like. Additionally, when the same output torque is output, a amount of injected fuel, the degree of opening of the throttle valve 20, the degree of opening of the swirl valve, and the degree of opening of the EGR valve 196 are much different between the ultra lean burn and the uniform combustion. Accordingly, if these values are rapidly changed, drivability is deteriorated. Additionally, combustion is changed to the uniform combustion when an abnormality occurs in the hydraulic brake apparatus. This includes a case in which an abnormality occurs in the braking-force assisting apparatus 8. Additionally, the state of the engine is stepwisely or gradually changed from the state of uniform combustion to the state of ultra lean combustion.

The engine control apparatus 220 is connected to the brake control apparatus 144 via a communication device so that exchange of information is performed therebetween. Negative pressure information which represents a negative pressure in the negative pressure chamber 12a detected by the booster negative pressure sensor 234 is provided from the engine control apparatus 220 to the brake control apparatus 144. Opening-degree decreasing information which instructs the engine control apparatus 220 to decrease of a degree of opening of the throttle valve 20 and opening-degree control permitting information which instructs the engine control apparatus 220 to control the degree of opening are provided from the brake control apparatus 144 to the engine control apparatus 220. The opening-degree control permitting information is provided when there is no need to decrease the degree of opening. As mentioned above, when the degree of opening of the throttle valve 20 is decreased during the ultra lean burn, a state of combustion must be changed to the uniform combustion. Accordingly, there is a problem in that a rate of fuel consumption is increased. In order to eliminate such a problem, in the present embodiment, a frequency of decreasing the degree of opening of the throttle valve 20 during the ultra lean burn is decreased.

A description will now be given of an operation of the brake apparatus shown in FIG. 1.

When the brake pedal 10 is pressed, an operating force to the brake pedal 10 is boosted by the booster 12, and is transmitted to the master cylinder 14. In the master cylinder 14, a fluid pressure corresponding to the operating force is generated in each of the pressurizing chambers, and the generated pressure is transmitted to the brake cylinders 26. If a tendency of locking of the left and right front wheels is excessive, an antilock control is performed so as to maintain an appropriate brake slip state. That is, the pressure in the brake cylinders 26 is controlled by the solenoid valves 90 and 100 according to the pressure of the brake fluid discharged by the pump 40. It should be noted that the pressure in the brake cylinders 26 may be controlled based on a pressure of the brake fluid in the master cylinder 14.

Figure 5:
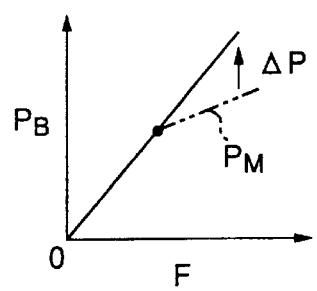
FIG. 5 is a graph showing a relationship between a pressure in a brake cylinder and a force applied to a brake pedal.
Figure 6:
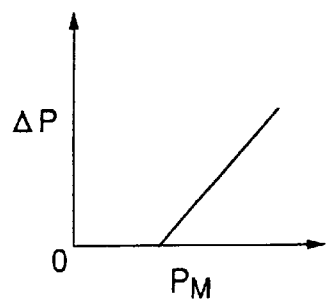
FIG. 6 is a graph showing a relationship between a pressure difference and a master cylinder pressure.

Additionally, when the operating force applied to the brake pedal 10 is increased and the booster reaches its boost limit, a pump motor 160 is operated. Accordingly, the pressure in the brake cylinders 26 is increased so as to be controlled to a value corresponding to the operating force by a control of the solenoid 74 of the pressure control valve 30. A pressure higher than the master cylinder pressure $P_M$ by a pressure difference $\Delta P$ is generated in the brake cylinders 26. The pressure difference $\Delta P$ is an increased amount of the brake cylinder pressure $P_B$ relative to the master cylinder pressure $P_M$. Accordingly, as shown in FIG. 5, the braking force can be increased with a uniform increasing slope before and after the boost limit of the booster 12 is reached. A relationship between the pressure difference $\Delta P$ and the master cylinder pressure $P_M$ is as shown in a graph of FIG. 6. A current supplied to the solenoid 74 of the pressure control valve 30 is controlled so that the pressure difference shown in FIG. 6 is achieved.

The vacuum booster 12 cannot boost the operating force applied to the brake-operating member after a pressure in the pressure changing chamber 12b increases from a negative pressure and reaches an atmospheric pressure. If the braking force is increased by a device other than the booster 12 after the boost limit is reached, the braking force can be increased with an appropriate slope (for example, with a substantially uniform slope). Thus, the braking force can be increased with a stable slope irrespective of whether or not the boost limit is reached. Thus, safeness and a feel of a braking operation can be improved.

In the present embodiment, the braking-force assisting apparatus 8 is constituted by the reservoir 98, the pump 40, the pump motor 160, the pressure control valve 30, the flow control valve 140, the pump motor 160 of the brake control apparatus 144 and units for controlling the pressure control valve 30 and the flow control valve 140.

Additionally, a determination as to whether or not the booster 12 reaches its boost limit can be made based on the master cylinder pressure $P_M$ and the negative pressure in the negative pressure chamber 12a. Since the boost limit of the booster 12 is determined by a pressure difference between the pressures in the negative pressure chamber 12a and the pressure changing chamber 12b when the pressure in the pressure changing chamber 12b reaches an atmospheric pressure, the boost limit $P_S$ of the booster 12 can be estimated based on the negative pressure in the negative pressure chamber 12a as shown in FIG. 4. If the master cylinder pressure $P_M$ reaches the boost limit $P_S$, it can be determined that the boost function of the booster 12 has reached its limit. In the present embodiment, a boost-limit detecting unit is constituted by the master-cylinder-pressure sensor 152, the booster negative pressure sensor 234 and parts for determining whether or not the booster 12 of the brake control apparatus 144 reaches its boost limit.

Figure 10:
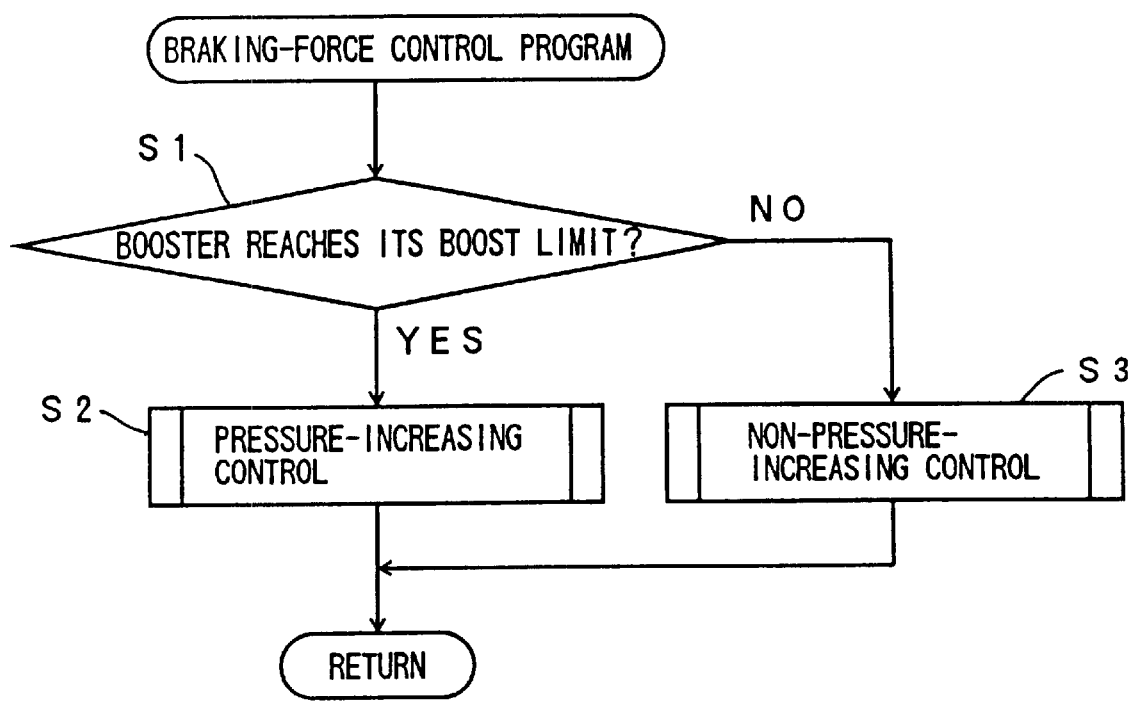
FIG. 10 is a flowchart of a braking-force control operation.

A control of the braking-force assisting apparatus 8 is performed in accordance with a braking-force control program represented by a flowchart of FIG. 10.

In step S1, it is determined whether or not the booster 12 reaches its boost limit. That is, it is determined whether or not the master cylinder pressure $P_M$ is equal to or greater than the boost limit $P_S$. If it is determined that the boost limit has been reached, the routine proceeds to step S2 so as to perform a pressure-increasing control. On the other hand, if it is determined that the boost limit has not been reached, the routine proceeds to step S3 so as to perform the non-pressure-increasing control.

In the pressure-increasing control, a current is supplied to the solenoid 74 of the pressure control valve 30 so that the pressure difference $\Delta P$ is achieved and the flow control valve 140 is opened if necessary. Additionally, the pump motor 160 is driven. On the other hand, in the non-pressure-increasing control, the current supplied to the solenoid 74 of the pressure control valve 30 is set to zero, and the flow control valve 140 is closed. Additionally, the pump motor 160 is stopped. It should be noted that the pump motor 160 may be driven according to the antilock control program.

As mentioned above, when the braking force assisting apparatus 8 is normal, the braking force after the booster 12 reaches the boost limit can be increased with the same slope as the slope before the booster limit is reached. However, when an abnormality occurs in the braking-force assisting apparatus 8, the braking force cannot be increased with the same slope. In order to eliminate such a problem, when an abnormality is detected in the braking-force assisting apparatus 8 and when the negative pressure in the negative pressure chamber 12a is less than a predetermined negative pressure described later, the opening-degree decreasing information is output to the engine control unit 220 so as to decrease the degree of opening of the throttle valve 20. When the negative pressure in the negative pressure chamber 12a is increased, the boost limit of the booster 12 can be increased. Thus, if the brake pedal 10 is operated by a large operating force, the braking force can be sufficiently boosted by the booster 12. An abnormality of the braking-force assisting apparatus 8 can be detected by the abnormality detecting device 158. In the present embodiment, the abnormality detecting device 158 detects an abnormality occurring in an electric system. It should be noted that the abnormality detecting device 158 may detect an abnormality occurring in a hydraulic system such as fluid leakage in the inlet passage 110 or the outlet passage 114.

The above-mentioned predetermined negative pressure is set to be a non-operating-time preset negative pressure β1 during a non-operating time, and is set to one of an operating-time preset negative pressure β2 and a necessary negative pressure, whichever is greater, during an operating time. The operating-time preset negative pressure β2 is smaller than the non-operating-time preset negative pressure β1, that is, the operating-time preset negative pressure β2 is closer to an atmospheric pressure than the non-operating-time preset negative pressure β1. Accordingly, a frequency of operations for decreasing the degree of opening of the throttle valve 20 when the brake pedal 10 is being operated is smaller than that when the brake pedal 10 is not being operated. When the brake pedal 10 is not being operated, the negative pressure chamber 12a and the pressure changing chamber 12b are connected to each other so that the pressure in the pressure changing chamber 12b is equal to the pressure in the negative pressure chamber 12a. When the brake pedal 10 is operated, the pressure changing chamber 12b is alternately connected to either the negative pressure chamber 12a or atmosphere. Thereby, the negative pressure in the negative pressure chamber 12a is decreased. However, if the negative pressure is sufficiently increased when the brake pedal is not operated, a condition can be established that the booster 12 does not reach its boost limit even when the negative pressure is decreased while the brake pedal 10 is operated. In the present embodiment, the non-operating-time preset negative pressure β1 is set to a value (closer to an absolute vacuum), which is greater than a value at which the boost limit is not reached when a brake operation is performed with a normal operating force by more than an amount of decrease in the negative pressure when a normal braking operation is performed. Additionally, the operating-time preset negative pressure β2 is set to a value at which the boost limit is not reached by a normal braking operation.

During a braking operation, since an engine load is not very large, as mentioned above, an ultra lean combustion is performed normally. However, when the degree of opening of the throttle valve 20 is decreased, the state of combustion must be changed to a uniform combustion. This causes a problem in that a rate of fuel consumption is increased. On the other hand, when a braking operation is not performed, there is a case in which the uniform combustion is performed. Thus, a rate of fuel consumption may not be increased if the degree of opening of the throttle valve 20 is decreased. Accordingly, an increase in a rate of fuel consumption can be suppressed by decreasing the degree of opening of the throttle valve 20 when the brake pedal 10 is not being operated rather than when the brake pedal 10 is being operated.

Figure 7:
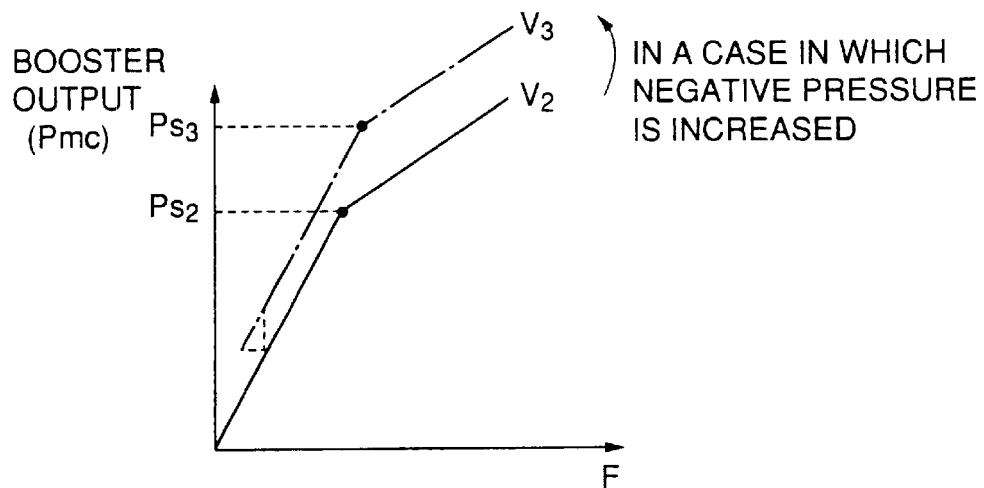
FIG. 7 is a graph for explaining an output of the vacuum booster when a negative pressure is increased.

When the negative pressure is increased when the braking operation is performed, a braking force is increased if an operating force applied to the brake pedal 10 by a driver is maintained constant and a stroke of the brake pedal is increased as shown in FIG. 7. On the contrary, in order to maintain the braking force at a constant value, the driver must decrease the operating force applied to the brake pedal 10 which deteriorates a brake feel. However, in the present embodiment, a frequency of operations for decreasing the degree of opening of the throttle valve 20 is decreased when the braking operation is performed, and, thereby, deterioration in the brake feel can be suppressed.

The above-mentioned necessary negative pressure is determined based on the master cylinder pressure $P_M$ as an operating force relating amount which relates to an operating force applied to the brake pedal 10 and a rate of increase in the master cylinder pressure $P_M$ as a rate of increase of the operating force relating amount.

The necessary negative pressure is set to a greater value when the master cylinder pressure $P_M$ is large than when the master cylinder pressure $P_M$ is small. This is because the boost limit of the booster 12 must be increased more when the master cylinder pressure $P_M$ is large than when the master cylinder pressure $P_M$ is small since the booster 12 is closer to its boost limit when the master cylinder pressure $P_M$ is large than when the master cylinder pressure $P_M$ is small. If the necessary negative pressure is increased and the negative pressure in the negative pressure chamber 12a is increased, the boost limit of the booster 12 is increased, which condition allows boosting an operating force by the same ratio.

The necessary negative pressure is set larger when a rate of increase in the master cylinder pressure $P_M$ is large than when the rate of increase in the master cylinder pressure $P_M$ is small. This is because the negative pressure must be increased when the rate of increase is large so as to maintain a sufficient operating speed of the booster 12. Additionally, a possibility for reaching the boost limit is higher when the rate of increase is large than when the rate of increase is small. If the master cylinder pressure $P_M$ is equal, the possibility for reaching the boost limit is high when the rate of increase is large since an operating force is rapidly increased. On the other hand, when the rate of increase is small, the possibility for reaching the boost limit is low. If the rate of increase is a negative value and when the operating force is being released, the possibility for reaching the boost limit is further decreased.

In the present embodiment, the negative pressure in the negative pressure chamber 12a is not directly compared with the necessary negative pressure but a comparison is made between the boost limit and a value (hereinafter referred to as an operational state value) obtained by adding a boost-limit-arrival estimating value (hereinafter referred to as an arrival estimating value) corresponding to the rate of increase to the master cylinder pressure $P_M$. If the degree of opening of the throttle valve 20 is controlled so that a state in which the boost limit is larger than the operational state value is maintained, the negative pressure in the negative pressure chamber 12a is maintained to be greater than the necessary negative pressure. As mentioned above, a value of the master cylinder pressure $P_M$ corresponds to the operating force applied to the brake pedal 10; the arrival estimating value corresponds to the rate of increase in the master cylinder pressure $P_M$; and a value of the boost limit corresponds to the negative pressure in the negative pressure chamber 12a. Accordingly, a comparison between the negative pressure in the negative pressure chamber 12a and the necessary negative pressure corresponds to a comparison between the operational state value and the boost limit. The arrival estimating value is set to a value α1 when the rate of increase in the master cylinder pressure $P_M$ is a positive value, and is set to a value α2 which is smaller than the value α1 when the rate of increase is a negative value. Since the possibility for rapidly reaching its boost limit is higher when the rate of increase is large than when the rate of increase is small, the arrival estimating value is increased when the rate of increase is large. The operational state value is large when the operating-force relating amount is large and the rate of increase in the operating force is large.

When the boost limit is greater than the operational state value, the booster 12 has not reached its boost limit, and, thus, it can be determined that the possibility for reaching the boost limit is low. In such a case, the negative pressure is greater than the necessary negative pressure, and the degree of opening of the throttle valve 20 is not required to be decreased. When the boost limit is smaller than the necessary negative pressure, it can be determined that the boost limit has been reached or the possibility for rapidly reaching the boost limit is high. In such a case, the negative pressure is smaller than the necessary negative pressure, and the degree of opening of the throttle valve 20 is required to be decreased. Thus, the opening-degree decreasing information is output to the engine control apparatus 220.

As mentioned above, if the negative pressure in the negative pressure chamber 12a is maintained to be greater than the necessary negative pressure, the boost limit of the booster 12 can be increased so as to increase a braking force even if an abnormality occurs in the braking-force assisting apparatus 8.

In the present embodiment, the degree of opening of the throttle valve 20 is decreased during the non-operating time, so that during the operating time the negative pressure in the negative pressure chamber 12a is not decreased below the predetermined negative pressure which is determined to be the greater one of the necessary negative pressure determined as mentioned above and the operating-time preset negative pressure $\beta 2$. That is, when the necessary negative pressure is smaller than the operating-time preset negative pressure $\beta 2$, the negative pressure in the negative pressure chamber 12a is set so as not to be smaller than the operating-time preset negative pressure $\beta 2$. On the other hand, when the necessary negative pressure is greater than the operating-time preset negative pressure $\beta 2$, the negative pressure in the negative pressure chamber 12a is set so as not to be smaller than the necessary negative pressure.

A description will now be given, with reference to FIG. 8, of a throttle-opening-degree control operation.

First, in S11, it is determined whether or not the brake pedal 10 is being operated based on an output signal of the brake switch 150. If the brake pedal 10 is being operated, the routine proceeds to step S12. In step S12, it is determined whether or not there is an abnormality in the braking-force assisting apparatus 8 by the abnormality detecting device 158. If it is determined that there is an abnormality in the braking-force assisting apparatus 8, the routine proceeds to step S13. In step S13, it is determined whether or not a negative pressure in the negative pressure chamber 12a is smaller than the operating-time preset negative pressure $\beta 2$. The negative pressure in the negative pressure chamber 12a is known by the negative pressure information provided from the engine control apparatus 220. If the negative pressure is larger than the operating-time preset negative pressure $\beta 2$, that is, if the determination is negative, the routine proceeds to step S14. In step S14, it is determined whether or not the negative pressure in the negative pressure chamber 12a is greater than the necessary negative pressure corresponding to the operating force applied to the brake pedal 10. If the negative pressure is smaller than the necessary negative pressure, the routine proceeds to step S15 so as to output the opening-degree decreasing information. On the other hand, if the negative pressure is greater than the necessary negative pressure, the routine proceeds to step S16 so as to output the opening degree control permitting information.

If it is determined, in step S13, that the negative pressure in the negative pressure chamber 12a is smaller than the operating-time preset negative pressure $\beta 2$, that is, the determination in step S13 is affirmative, the routine proceeds to step S15 so as to output the opening-degree decreasing information. Additionally, if it is determined, in step S12, that the braking-force assisting apparatus 8 is normal, the routine proceeds to step S16. That is, if the braking-force assisting apparatus 8 is normal, the opening-degree decreasing information is not output. In this case, a braking force is increased by the braking-force assisting apparatus 8 after the booster 12 reaches its boost limit as mentioned above.

Additionally, if it is determined, in step S11, that the brake pedal is not being operated, the routine proceeds to step S17. In step S17, it is determined whether or not the negative pressure is smaller than the non-operating-time preset negative pressure $\beta 1$. If the negative pressure is smaller than the non-operating-time preset negative pressure $\beta 1$, the routine proceeds to step S15 so as to output the opening-degree decreasing information. Otherwise, the routine proceeds to step S16.

Figure 9:
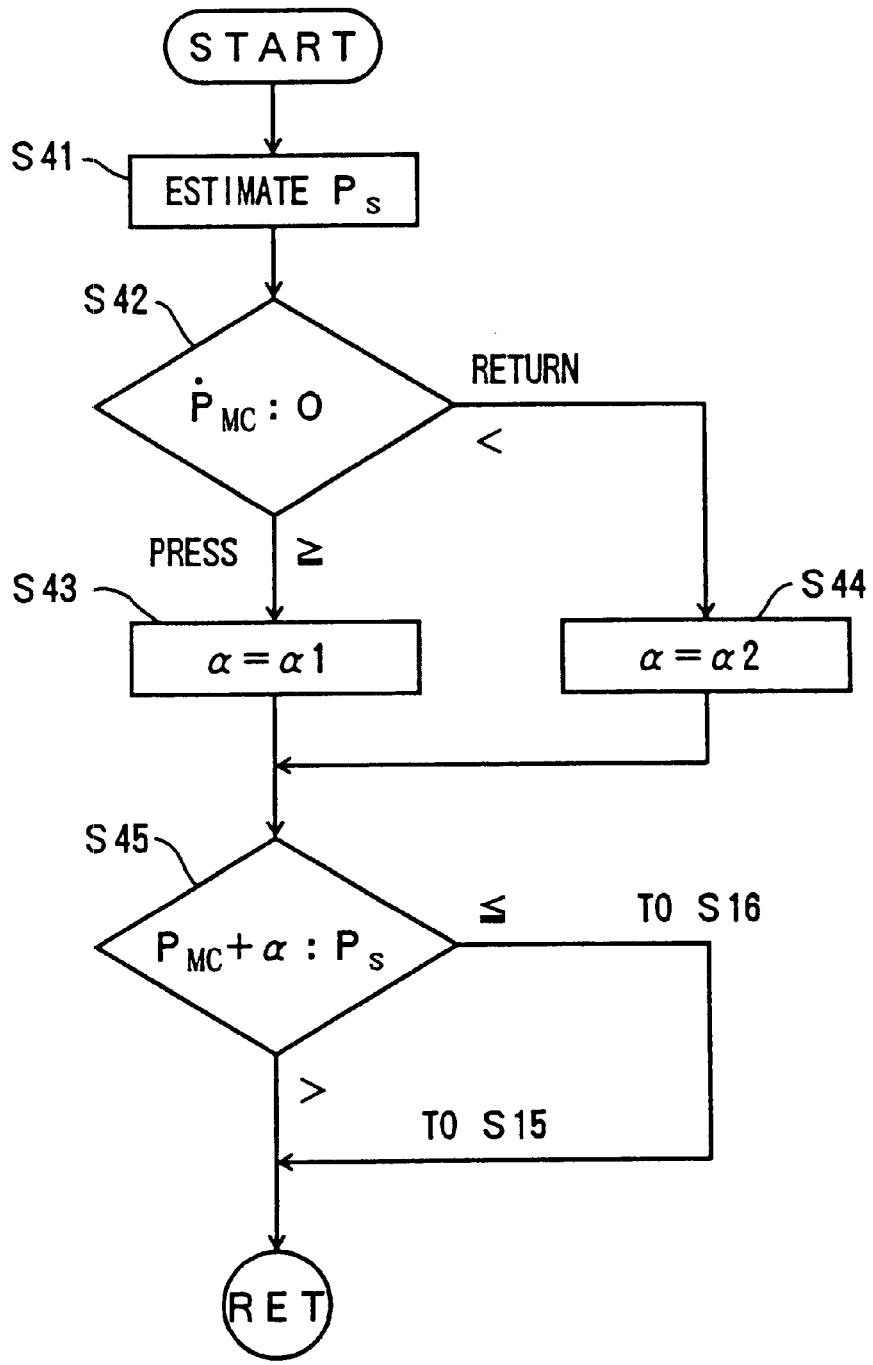
FIG. 9 is a flowchart of a process in step S14 of FIG. 8.

A description will now be given, with reference to FIG. 9, of the determination in step S14 as to whether or not the negative pressure in the negative pressure chamber 12a is greater than the necessary negative pressure.

First, in step S41, the boost limit $P_S$ is obtained based on the negative pressure in the negative pressure chamber 12a, the information of the negative pressure being provided by the engine control apparatus 220. The boost limit $P_S$ can be obtained according to a relationship between the boost limit $P_S$ and the negative pressure which is stored as table information shown in FIG. 4. In step S42, it is determined whether or not a rate of increase in the master cylinder pressure $P_M$ is equal to or greater than zero. If the rate of increase is equal to or greater than zero, the routine proceeds to step S43. In step S43, the arrival estimating value a is set to the value $\alpha 1$. On the other hand, if the rate of increase is less than zero, the routine proceeds to step S44 so as to set the arrival estimating value $\alpha$ to the value $\alpha 2$. Then, in step S45, the boost limit $P_S$ is compared with the operation state value which is obtained by adding the arrival estimating value $\alpha$ to the master cylinder pressure $P_M$.

Figure 8:
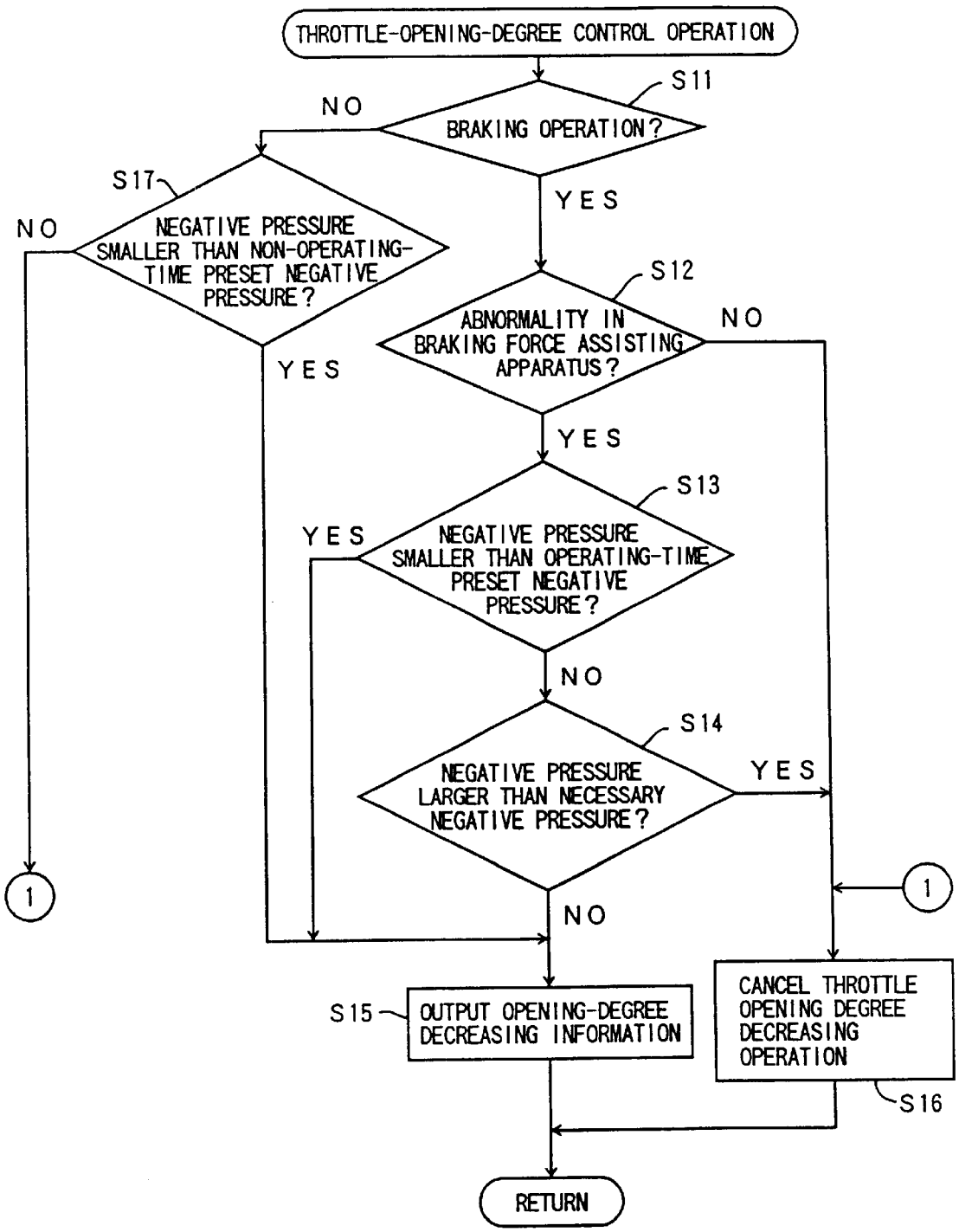
FIG. 8 is a flowchart of a throttle-opening-degree control operation.

If the boost limit $P_S$ is smaller than the operation state value, the routine proceeds to step S15 of FIG. 8 so as to output the opening-degree decreasing information. On the other hand, if the boost limit $P_S$ is equal to or greater than the operational state value, the routine proceeds to step S16 of FIG. 8 so as to output the opening-degree control permitting information.

Figure 11:
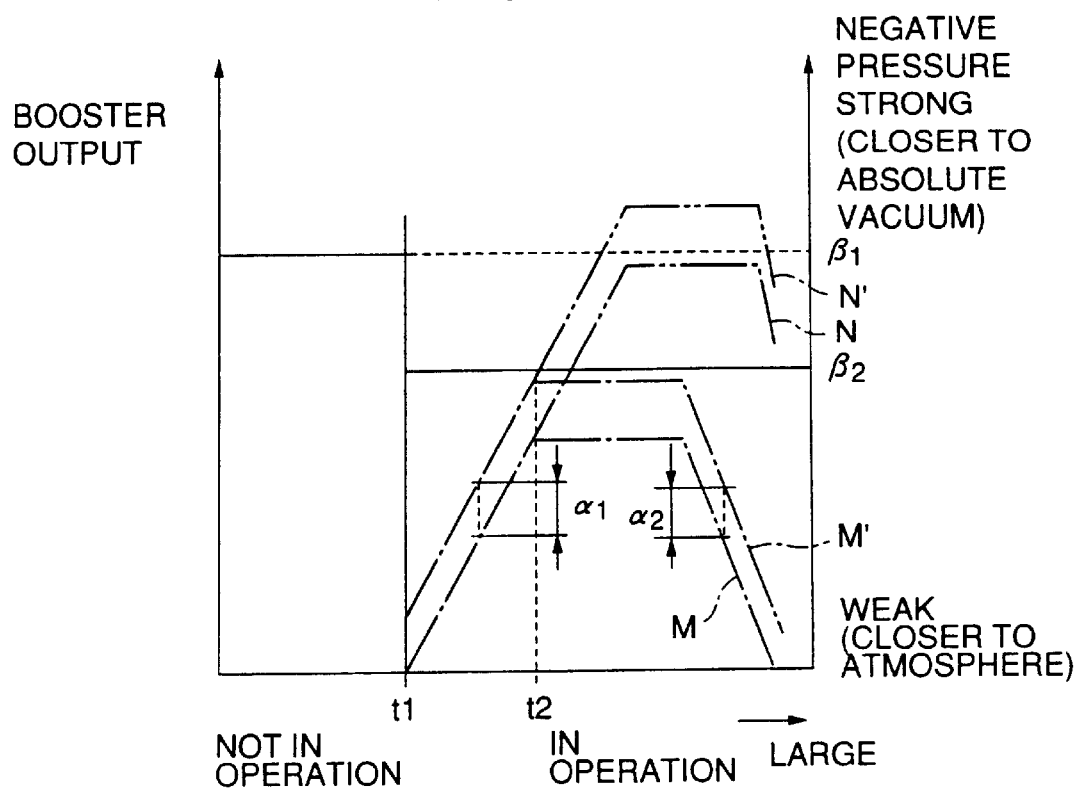
FIG. 11 is a diagram for explaining an operation of the vacuum booster.

A description will now be given, with reference to FIG. 11, of a specific example of the above-mentioned control operation. When the brake pedal 10 is not being operated and when the negative pressure in the negative pressure chamber 12a is greater than the non-operating-time preset negative pressure $\beta 1$, the opening-degree decreasing information is not output. However, when the negative pressure is decreased to a value smaller than the non-operating-time preset negative pressure $\beta 1$, the opening-degree decreasing information is output. When the brake pedal 10 is not being operated, the negative pressure is maintained to a value greater than the non-operating time preset negative value $\beta 1$.

If the brake pedal 10 is operated at a time t1, the negative pressure is decreased. However, if the negative pressure is maintained to be greater than the non-operating-time preset negative pressure $\beta 1$ during the non-operating time, the booster 12 rarely reaches its boost limit when a normal braking operation is performed. Accordingly, the operating force applied to the brake pedal 10 can be boosted with a constant ratio. When the brake pedal 10 is being operated, the negative pressure is controlled so that the negative pressure is not smaller than the operating-time preset negative pressure $\beta 2$. However, if the necessary negative pressure is greater than the operating-time preset negative pressure β2, the negative pressure is controlled so as not to be smaller than the necessary negative pressure.

When the brake pedal 10 is operated along a single dashed chain line M, the operational state value is changed along a single dashed chain line M'. In a range where the operating force is not very large, the operational state value M' cannot be greater than the operating-time preset negative pressure β2. Accordingly, the degree of opening of the throttle valve 20 is controlled so that the negative pressure in the negative pressure chamber 12a is not decreased to a value smaller than the operating-time preset negative pressure 12.

When the brake pedal 10 is operated with a large operating force, that is, when the brake pedal 10 is operated along a double dashed chain line N, the necessary negative pressure exceeds the operating-time preset negative pressure β2 at a time t2. Accordingly, the negative pressure is increased so that the boost limit is not decreased to a value smaller than the operational state value N'.

As mentioned above, if the negative pressure in the negative pressure chamber 12a is maintained to be greater than the necessary negative pressure, the boost limit can be increased in response to the operating force relating amount. Accordingly, if the brake pedal 10 is operated with a large operating force, the operating force can be appropriately boosted by the booster 12. Since the negative pressure in the negative pressure chamber 12a cannot be an absolute vacuum, the boost limit cannot be a infinitely large value. However, if an abnormality occurs in the braking-force assisting apparatus 8, the boost limit can be increased so that the master cylinder pressure can be increased to increase the braking force. In the present embodiment, when the braking operation is being performed, the opening-degree decreasing information is output only when it is necessary. That is, the opening-degree decreasing information is output only when an abnormality occurs in the braking-force assisting apparatus 8 and when the negative pressure in the negative pressure chamber 12a is greater than one of the operating-time preset negative pressure β2 and the necessary negative pressure, which one is greater than the other. Accordingly, the degree of opening of the throttle valve 20 is positively decreased when it is necessary, and is not decreased unnecessarily. Thus, a frequency of decreasing operations for decreasing the degree of opening of the throttle valve 20 can be decreased so that deterioration in a rate of fuel consumption due to a decrease in the degree of opening of the throttle valve 20 when the ultra lean burn is performed can be suppressed. Additionally, since a change in the negative pressure corresponding to the operating force when the braking operation is being performed, deterioration in a brake feel can be suppressed.

Figure 12:
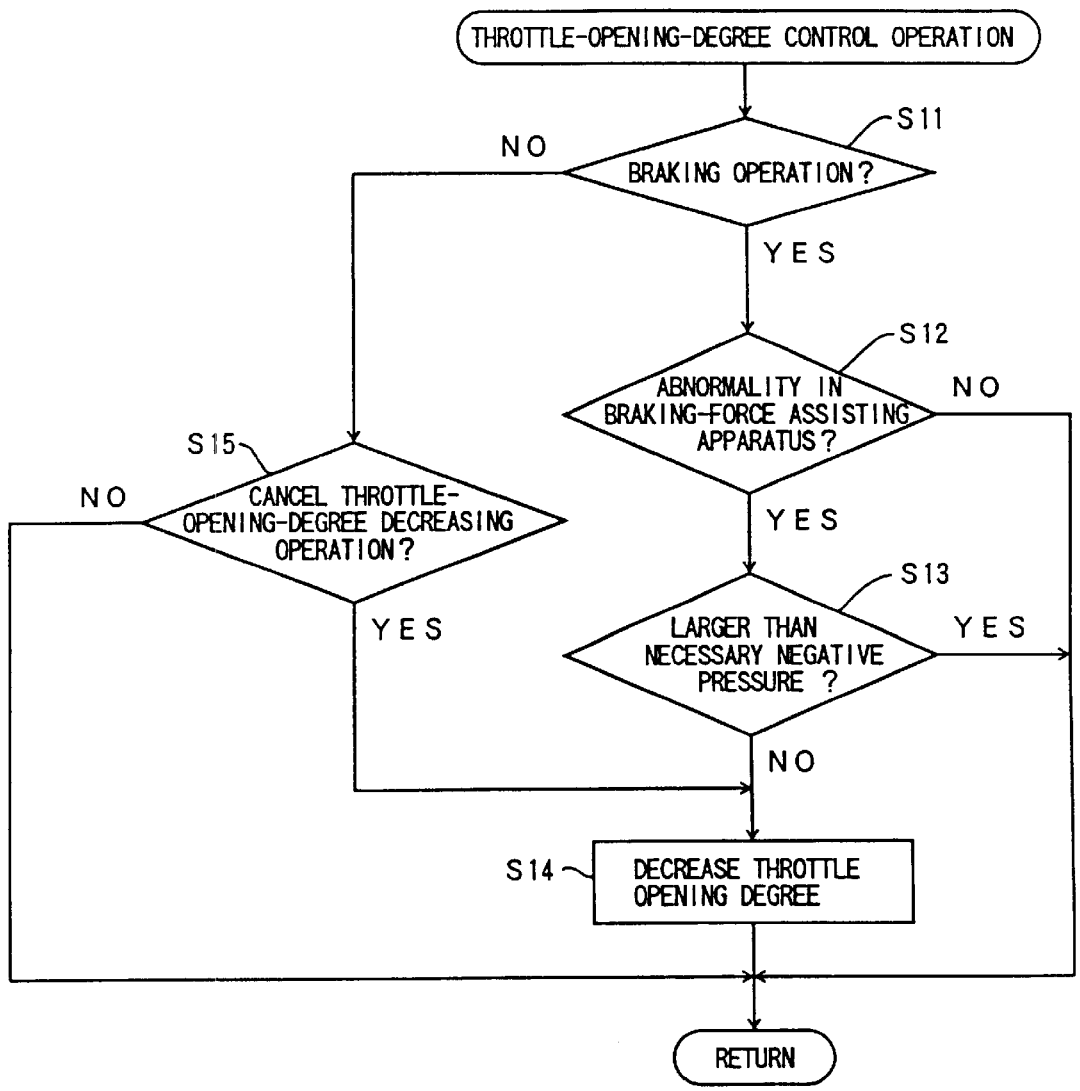
FIG. 12 is a flowchart of an operation according to a throttle-opening-degree control program stored in a ROM of a brake control apparatus included in the brake apparatus shown in FIG. 1.

It should be noted that, in the above-mentioned embodiment, although the negative pressure is set not to be smaller than one of the operating-time preset negative pressure β2 and the necessary negative pressure, which one is greater than the other, the operating-time preset negative pressure β2 is not necessarily considered and the negative pressure may be merely maintained so as not to be smaller than the necessary negative pressure as shown in the flowchart of FIG. 12. In such a case, the boost limit corresponding to the negative pressure is controlled not to be smaller than the operating force relating amount M' or N'. In this case, it can be considered that the operating-time preset negative pressure β2 corresponds to the necessary negative pressure (a variable value). However, in this case, the non-operating-time preset negative pressure β1 must be set to a value which is not exceeded by the operating-time preset negative pressure β2. That is, the non-operating-time preset negative pressure β1 must be set to a value greater than a value obtained by adding an amount of decrease in the negative pressure when a braking operation is performed to a value at which the boost limit is not reached when the brake pedal 10 is being operated with a large operating force. Alternatively, the necessary negative pressure may not be considered and the negative pressure may be controlled so as not to be smaller than the operating-time preset negative pressure β2. Additionally, the negative pressure may be controlled so as not to be smaller than one of the necessary negative pressure and the operating-time preset negative pressure β2, which one is smaller than the other. In any case, a frequency of decreasing operations for decreasing the degree of opening of the throttle valve 20 can be decreased, and deterioration in a brake feel can be suppressed.

Additionally, the necessary negative pressure may be determined based on only the master cylinder pressure $P_M$ or only a rate of increase in the master cylinder pressure $P_M$, or may be determined by considering other conditions. That is, the operational state value may be set to a value of the master cylinder pressure $P_M$ itself. Additionally, the arrival estimating value α may be continuously changed based on a rate of increase in the master cylinder pressure $P_M$.

Further, values of the non-operating-time preset negative pressure β1 and the operating-time preset negative pressure β2 are not limited to the values described above, and other values may be used. For example, the operating-time preset negative pressure β2 may be set to a value at which the boost limit is not reached when the brake pedal is operated with a large operating force, and the non-operating-time preset negative pressure β1 is set to be a value greater than a value obtained by adding an amount of decrease in the negative pressure when the brake pedal 10 is operated with a large operating force one time to the operating-time preset negative pressure β2. Additionally, the operating-time preset negative pressure β2 may be set to a minimum value which is needed for the negative pressure chamber 12a.

Additionally, the negative pressure may not necessarily be maintained to be greater than the non-operating-time preset negative pressure β1 when a braking operation is not performed. In practice, the degree of opening of the throttle valve 20 may be decreased when the negative pressure is needed, that is, only when the negative pressure in the negative pressure chamber 12a becomes smaller than the necessary negative pressure. Additionally, the degree of opening of the throttle valve 20 may be decreased only when a braking operation is not being performed. As mentioned above, if the negative pressure in the negative pressure chamber 12a is sufficiently increased when a braking operation is not being performed, there may be a case in which it is not necessary to decrease the degree of opening of the throttle valve 20 when a braking operation is being performed.

Additionally, in the above-mentioned embodiment, when an abnormality occurs in the braking force assisting apparatus 8, it is determined whether or not the opening-degree decreasing condition is satisfied so that the opening-degree decreasing information is output when the opening-degree decrease condition is satisfied. However, when an abnormality occurs in the braking-force assisting apparatus 8, the degree of opening of the throttle valve 20 may be decreased by a value corresponding to a target boost limit (corresponding to a target negative pressure of the negative pressure chamber 12a). The target boost limit can be determined based on at least one of the master cylinder pressure and a rate of increase in the master cylinder pressure. For example, according to a graph shown in FIG. 14, a degree of opening may be increased when the target boost limit is small, and the degree of opening may be decreased when the target boost limit is large. In the present embodiment, the degree of opening of the throttle valve 20 is controlled according to execution of a throttle-opening-degree control program represented by the flowchart of FIG. 13.

Figure 13:
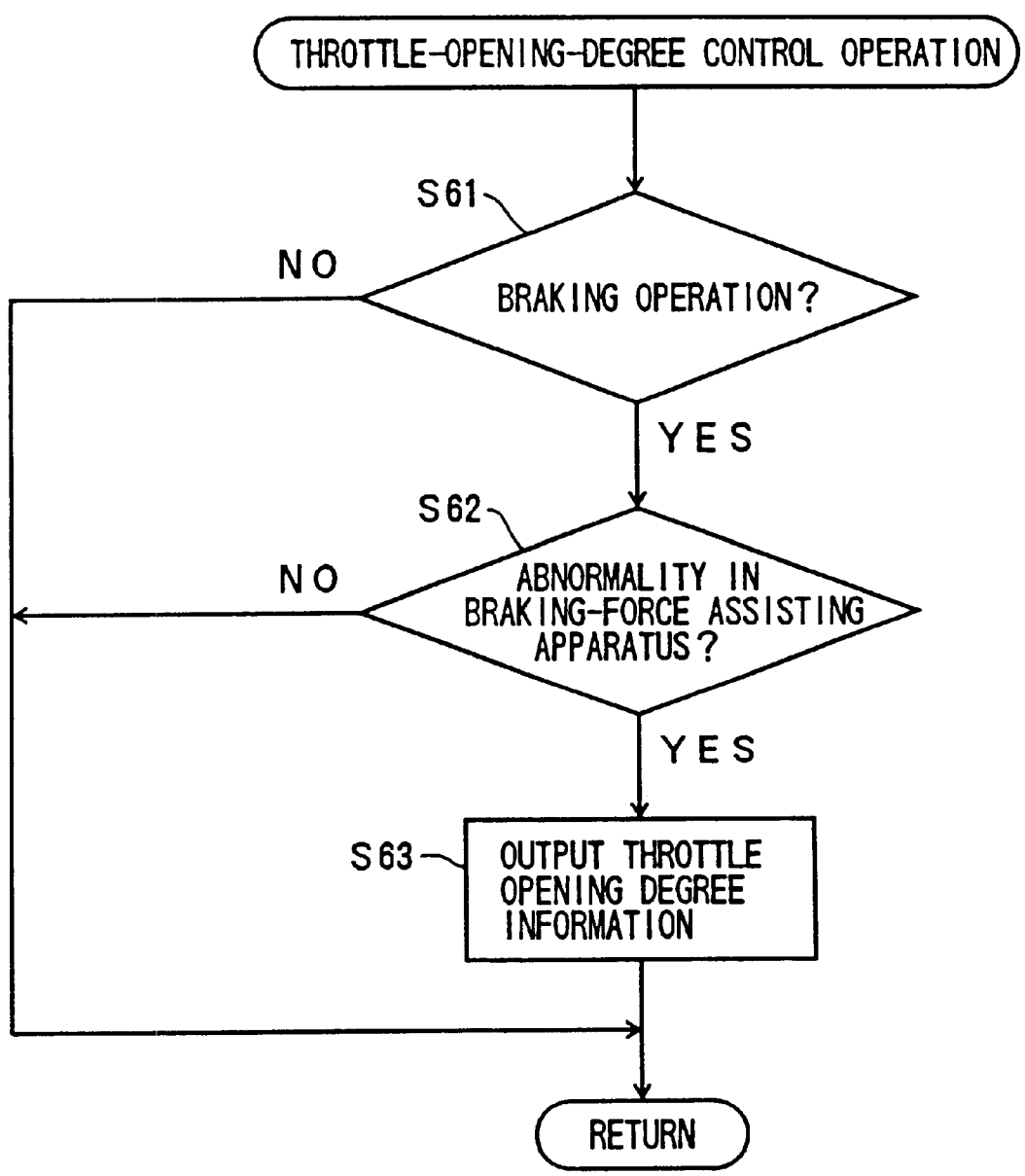
FIG. 13 is a flowchart of an operation according to a throttle-opening-degree control program stored in a ROM of a brake control apparatus included in a brake apparatus according to a second embodiment of the present invention.
Figure 14:
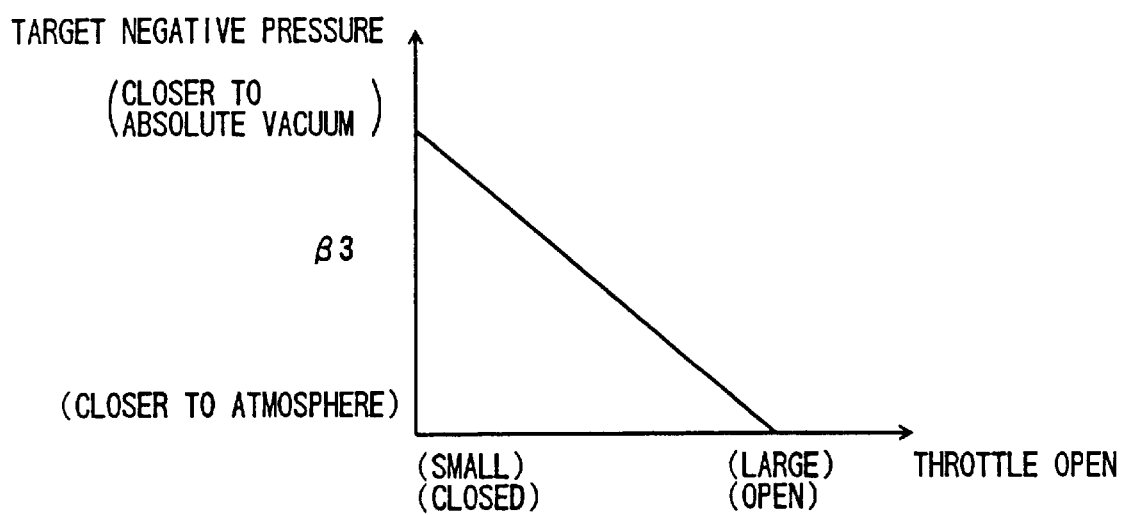
FIG. 14 is a graph showing a relationship between a throttle opening degree and a target pressure.

In FIG. 13, it is determined, in step S61, whether or not a braking operation is being performed. If a braking operation is being performed, the routine proceeds to step S62. In step S62, it is determined whether or not an abnormality occurs in the braking force assisting apparatus 8. If it is determined that an abnormality occurs in the braking-force assisting apparatus 8, the routine proceeds to step S63. In step S63, the degree of opening of the throttle valve 20 is determined according to the target negative pressure, and information for instructing a decrease of the degree of opening of the throttle valve 20 to the determined degree of opening is output. In such a case, opening-degree information which represents the degree of opening is output together with or instead of the opening-degree decreasing information. Additionally, an opening-degree decreasing time which represents a period for decreasing the degree of opening may be obtained based on the target boost limit so that opening-degree decreasing time information is output.

Additionally, the negative pressure may be controlled irrespective of whether the braking-force assisting apparatus 8 is normal or abnormal so that the negative pressure does not become smaller than the necessary negative pressure. If the negative pressure is controlled so as not to be smaller than the necessary negative pressure, an appropriate boost can be achieved if a braking force is large which results in a braking force corresponding to an operating force.

If the boost limit is increased when the braking force assisting apparatus 8 is normal, an operation of the brake force assisting apparatus 8 can be delayed. This provides an advantage in that a driving noise of the pump 40 is reduced.

Additionally, the braking-force assisting apparatus 8 may be operated when an emergency braking operation is required instead of being operated after the booster limit is reached. In such a case, it is determined whether or not a large braking force is required based on an operational speed of the brake pedal 10 so that the braking-force assisting apparatus 8 is operated so as to increase a braking force when it is determined that the a large braking force is required. In such a case, it is preferable that the negative pressure be sufficiently increased even when a braking operation is not being performed. Additionally, the braking force assisting apparatus 8 is not limited to the above-mentioned structure, and other structures may be used. For example, the brake-force assisting apparatus 8 may include an accumulator. Additionally, the pressure control valve 30 of the braking force assisting apparatus may be replaced with a simple solenoid valve. A pressure in the brake cylinders 26 may be controlled by operations of the pressure-increasing valves 90 and the pressure-decreasing valves 100, or may be controlled by an operation of the pump motor 160. Further, the braking-force assisting apparatus 8 is not essential. That is, the boost limit can be increased by increasing the negative pressure without using the braking-force assisting apparatus 8.

The present invention is not limited to the specifically disclosed embodiments, and variations and modifications may be made without departing from the scope of the present invention.

The present application is based on Japanese priority application No. 10-105119 filed on Apr. 15, 1998, the entire contents of which are hereby incorporated by reference.

What is claimed is:

1. A vacuum booster apparatus adapted to be used for a brake apparatus provided in a vehicle having an internal combustion engine, said vacuum booster apparatus comprising:

a vacuum booster having a first pressure chamber and a second pressure chamber, said first pressure chamber being connected to an intake pipe of said engine on a downstream side of an intake passage opening and closing valve, said second pressure chamber being selectively connectable to one of said first pressure chamber and atmosphere, said vacuum booster boosting an operating force applied to a brake operating member based on a pressure difference between said first pressure chamber and said second pressure chamber; and a throttle-opening-degree control device controlling a negative pressure in said first pressure chamber by controlling a degree of opening of said intake passage opening and closing valve, wherein said throttle-opening-degree control device includes operating-time opening-degree-decrease suppressing means for suppressing a decrease in the degree of opening of said intake passage opening and closing valve so that the frequency of decrease in the degree of opening the said intake passage opening and closing valve when said brake operating member is being operated is smaller than when said brake operating member is not being operated.

2. The vacuum booster apparatus as claimed in claim 1, wherein said throttle-opening degree control device includes opening-degree decreasing means for decreasing the degree of opening of said intake passage opening and closing valve when the negative pressure in said first pressure chamber is smaller than a preset negative pressure, and said operating-time opening-degree-decrease suppressing means includes operating-time preset-negative-pressure decreasing means for decreasing said preset negative pressure so that said preset negative pressure when said brake operating member is being operated is smaller than when said brake operating member is not being operated.

3. The vacuum booster apparatus as claimed in claim 2, wherein said operating-time preset-negative-pressure decreasing means includes operating-time preset-negative-pressure determining means for determining said preset negative pressure used when said brake operating member is being operated in accordance with at least one of an operating-force relating amount related to the operating force applied to said brake operating member and a rate of increase in the operating force relating amount.

\* \* \* \* \*

UNITED STATES PATENT AND TRADEMARK OFFICE
CERTIFICATE OF CORRECTION

PATENT NO.   : 6,612,660 B2
DATED        : September 2, 2003
INVENTOR(S)  : Mizutani et al.

It is certified that error appears in the above-identified patent and that said Letters Patent is hereby corrected as shown below:

<u>Title page,</u>
Item [73], Assignee, should read -- Toyota Jidosha Kabushiki Kaisha and Aisin Seiki Kabushiki Kaisa --

Signed and Sealed this

Twenty-fifth Day of November, 2003

JAMES E. ROGAN
*Director of the United States Patent and Trademark Office*